(12) United States Patent
Lee et al.

(10) Patent No.: US 12,084,635 B2
(45) Date of Patent: Sep. 10, 2024

(54) KEG CAP INTEGRATED WITH YEAST CAPSULE, COUPLER FOR COUPLING KEG CAP INTEGRATED WITH YEAST CAPSULE, AND BEER-MAKING DEVICE PROVIDED WITH SAME

(71) Applicant: INTHEKEG, INC., Seoul (KR)

(72) Inventors: Won Seok Lee, Gwangmyeong-si (KR); Chang Hun Jeong, Gunpo-si (KR); Taeil Kang, Seoul (KR); Byunggyu Kang, Seongnam-si (KR); Seungchul Lee, Seoul (KR); Yoonsang Kim, Seoul (KR)

(73) Assignee: INTHEKEG, INC., Seoul (KR)

( * ) Notice: Subject to any disclaimer, the term of this patent is extended or adjusted under 35 U.S.C. 154(b) by 0 days.

(21) Appl. No.: 18/203,623

(22) Filed: May 30, 2023

(65) Prior Publication Data
US 2023/0295541 A1 Sep. 21, 2023

Related U.S. Application Data

(62) Division of application No. 16/647,528, filed as application No. PCT/KR2018/010920 on Sep. 17, 2018, now Pat. No. 11,702,619.

(30) Foreign Application Priority Data

Sep. 18, 2017 (KR) .......................... 10-2017-0119868

(51) Int. Cl.
*C12C 5/02* (2006.01)
*C12C 11/02* (2006.01)
(Continued)

(52) U.S. Cl.
CPC ................ *C12C 5/02* (2013.01); *C12C 11/02* (2013.01); *C12C 13/10* (2013.01); *B67D 1/0829* (2013.01); *C12H 1/063* (2013.01)

(58) Field of Classification Search
CPC ........... C12C 5/02; C12C 13/10; C12C 11/00; C12C 11/02; B67D 1/0829; C12H 1/063
See application file for complete search history.

(56) References Cited

U.S. PATENT DOCUMENTS

2003/0177910 A1 9/2003 Lu et al.
2007/0199838 A1* 8/2007 Oh ..................... B65D 81/3222
206/219
(Continued)

FOREIGN PATENT DOCUMENTS

KR 10-0813648 B1 3/2008
KR 10-2017-0086880 A 7/2017

OTHER PUBLICATIONS

International Search Report in International Application No. PCT/KR2018/010920, dated May 9, 2019, 2pages.

*Primary Examiner* — Dana Ross
*Assistant Examiner* — Kuangyue Chen
(74) *Attorney, Agent, or Firm* — Park, Kim & Suh, LLC

(57) ABSTRACT

A beer-making device according to an embodiment of the present invention may comprise: a chamber; a keg containing wort and mounted in the chamber; a keg cap integrated with a yeast capsule, which closes the inside of the keg by being coupled to the keg and is provided with a wort discharge passage for discharging the wort contained in the keg, a gas discharge passage for discharging a gas inside the keg, and a wort hose coupled to a lower portion of the wort discharge passage and extended to the inner bottom surface of the keg, and in which a yeast capsule, containing yeast to be supplied to the wort contained in the keg, is mounted to the wort discharge passage; a coupler which is fixedly installed in the chamber, and is provided with a wort passage connected to the wort discharge passage when the keg cap is coupled, and a gas passage connected to the gas discharge passage when the keg cap is coupled; a passage unit for (Continued)

connecting the wort passage and the gas passage of the coupler; a pump connected to the passage unit; and a control unit for controlling the operation of the pump so that the yeast contained in the yeast capsule is supplied to the wort contained in the keg.

6 Claims, 27 Drawing Sheets

(51) Int. Cl.
*C12C 13/10* (2006.01)
*B67D 1/08* (2006.01)
*C12H 1/07* (2006.01)

(56) References Cited

U.S. PATENT DOCUMENTS

| | | |
|---|---|---|
| 2013/0056495 A1 | 3/2013 | Watts |
| 2014/0065266 A1* | 3/2014 | Shalev ................ B01F 23/236 261/138 |
| 2015/0152370 A1 | 6/2015 | Blichmann |
| 2015/0203800 A1 | 7/2015 | Hansmann |
| 2016/0194587 A1 | 7/2016 | Ellegood |
| 2016/0201018 A1 | 7/2016 | Watson et al. |
| 2018/0072972 A1* | 3/2018 | Shin ....................... C12C 13/10 |

* cited by examiner

KEG CAP INTEGRATED WITH YEAST CAPSULE, COUPLER FOR COUPLING KEG CAP INTEGRATED WITH YEAST CAPSULE, AND BEER-MAKING DEVICE PROVIDED WITH SAME

CROSS-REFERENCE TO RELATED APPLICATIONS

This application is a division of U.S. patent application Ser. No. 16/647,528, filed on Mar. 16, 2020, currently pending, which is the National Phase Application of PCT International Application No. PCT/KR2018/010920, filed on Sep. 17, 2018, and which claims priority from Korean Patent Application No. 10-2017-0119868, filed on Sep. 18, 2017. The disclosures of the above patent applications are incorporated herein by reference in their entirety.

TECHNICAL FIELD

The present disclosure relates to a beer manufacturing apparatus for directly producing and selling beer with living yeast on location without professional knowledge and automatically and easily manufacturing various types of beer at low cost at one time without being contaminated by contact with the outside.

BACKGROUND ART

Beer is alcoholic drink made by juicing and filtering malt from germinating barley, adding hop thereto, and then, fermenting the resultant with yeast.

Such a method of preparing beer includes preparing wort by boiling malt, fermenting a material obtained by supplying yeast to the wort, and maturing the fermented beer, and in this regard, beer sold at a supermarket or a big-box store is manufactured by sterilizing the beer as prepared above and then filling a bottle or a can with the beer for distribution and storage thereof.

However, when matured beer is sterilized, yeast dies, and thus, currently distributed beer is in a state in which yeast dies during sterilization treatment.

On the other hand, microbrew is beer with living yeast and is unique beer that is personally produced to enhance the flavor and aroma thereof, and it is possible to taste such microbrew only in a special place having brewery and to manufacture hundred thousand various types of microbrew or more depending on types of yeast and hop.

However, it is possible to manufacture microbrew through only complicated and various manufacturing processes, and in particular, a fermentation and maturement process requires huge equipment investment, long manufacturing lead time, much labor manpower, or the like, and a system for manufacturing microbrew is inefficient in that professional personnel needs to personally manage the whole manufacturing processes.

For fermentation of wort after wort is prepared, wort contained in a wort cask needs to be moved and contained in a fermenter for fermentation, in which case beer is likely to be contaminated due to contact with the outside and beer is likely to deteriorate due to contact with oxygen, and thus, all contact surfaces and flow channels need to be cleaned and sterilized to remove other germs other than yeast during fermentation, and accordingly, there is a problem in that much time and labor manpower are required.

That is, conventionally, huge equipment investment and manpower are required to manufacture microbrew, and hundreds of millions of won of equipment investment and much manpower are required even in order to manufacture microbrew with a small scale, and in particular, there is a problem in that professional knowledge or professional personnel for manufacture of microbrew.

Conventionally, a beer manufacturing apparatus produces beer by preparing a large amount of wort at one time and fermenting a large amount of beer in one tank, but this process has a problem in that whole beer becomes contaminated and useless when beer is slightly contaminated or beer needs to be stored for a long time to thus deteriorate when not being sold.

DISCLOSURE

Technical Problem

It is an object of the present disclosure to provide a beer manufacturing apparatus for directly producing and selling beer with living yeast on location without professional knowledge and automatically and easily manufacturing various types of beer at low cost at one time without being contaminated by contact with the outside.

It is an object of the present disclosure to provide a keg cap integrated with a yeast capsule and a coupler coupled to the keg cap.

Technical Solution

According to an embodiment of the present disclosure, a beer manufacturing apparatus includes a chamber, a keg containing wort therein mounted in the chamber, a yeast capsule integration-type keg cap that is coupled to the keg to seal an internal part of the keg, includes a wort discharge line configured to discharge the wort contained in the keg, a gas exhaust line configured to discharge internal gas of the keg, and a wort hose coupled to a lower part of the wort discharge line and formed a long way to an internal bottom surface of the keg, and in which an yeast capsule containing yeast to be supplied to the wort contained in the keg is mounted on the wort discharge line, a coupler that is fixedly installed in the chamber and includes a wort line connected to the wort discharge line and an air line connected to the gas exhaust line when the keg cap is coupled to the coupler, an flow path unit configured to connect the wort line and the air line of the coupler, a pump connected to the flow path unit, and a controller configured to control an operation of the pump to supply the yeast contained in the yeast capsule to the wort contained in the keg.

Advantageous Effects

In the beer manufacturing apparatus as configured above and a beer manufacturing method according to an exemplary embodiment of the present disclosure, beer with living yeast may be automatically and easily manufactured without being contaminated by contact with the outside without professional knowledge by simply mounting the sealed the keg 202 containing the wort therein manufactured and provided from a factory, in the chamber In the beer manufacturing apparatus and the beer manufacturing method according to an exemplary embodiment of the present disclosure, there are a plurality of chambers for independently adjusting a temperature and for independent fermentation, and thus, various types of beer may be manufactured at one time.

A keg cap integrated with a yeas capsule and a coupler coupled to the keg cap according to an exemplary embodiment of the present disclosure may automatically and easily supply yeast contained in the yeast capsule to wort contained in a keg.

It will be appreciated by persons skilled in the art that that the effects that could be achieved with the present disclosure are not limited to what has been particularly described hereinabove and other advantages of the present disclosure will be more clearly understood from the detailed description.

DESCRIPTION OF DRAWINGS

FIG. 12 is a schematic diagram showing a state in which a sterilization and washing cap is coupled to a coupler, FIG. 13 is a schematic diagram showing a state in which sterilization and washing water is circulated in an flow path unit, and FIG. 14 is a flowchart showing the sterilization and washing operation of an flow path unit using a beer manufacturing apparatus according to an exemplary embodiment of the present disclosure.

FIG. 15 is a schematic diagram showing a state in which a keg containing wort therein is coupled to a coupler, FIG. 16 is a schematic diagram showing a state in which wort contained in a keg is circulated in an flow path unit, FIG. 17 is a flowchart showing a smart infusing method according to an exemplary embodiment of the present disclosure, and FIG. 18 is a flowchart showing a smart infusing method according to another exemplary embodiment of the present disclosure.

FIG. 19 is a diagram showing a keg containing wort therein provided in a beer manufacturing apparatus according to an exemplary embodiment of the present disclosure, FIG. 20 is an exploded diagram showing the keg containing the wort therein illustrated in FIG. 19, FIG. 21 is a diagram showing a state in which a coupler is coupled to a keg cap of the keg containing the wort therein illustrated in FIG. 19, FIG. 22 is a schematic cross-sectional view of a keg cap with an yeast capsule integrated therewith according to an exemplary embodiment of the present disclosure, FIG. 23 is a schematic cross-sectional view of a coupler coupled to the keg cap illustrated in FIG. 22, FIG. 24 is a schematic cross-sectional view of a state which the keg cap illustrated in FIG. 22 and the coupler illustrated in FIG. 23 are coupled to each other, FIG. 25 is an enlarged view of a portion 'A' of FIG. 24, FIG. 26 is an enlarged view of a portion 'B' of FIG. 24, and FIG. 27 is a an enlarged view of a portion 'C' of FIG. 24.

BEST MODE

Figure 1:
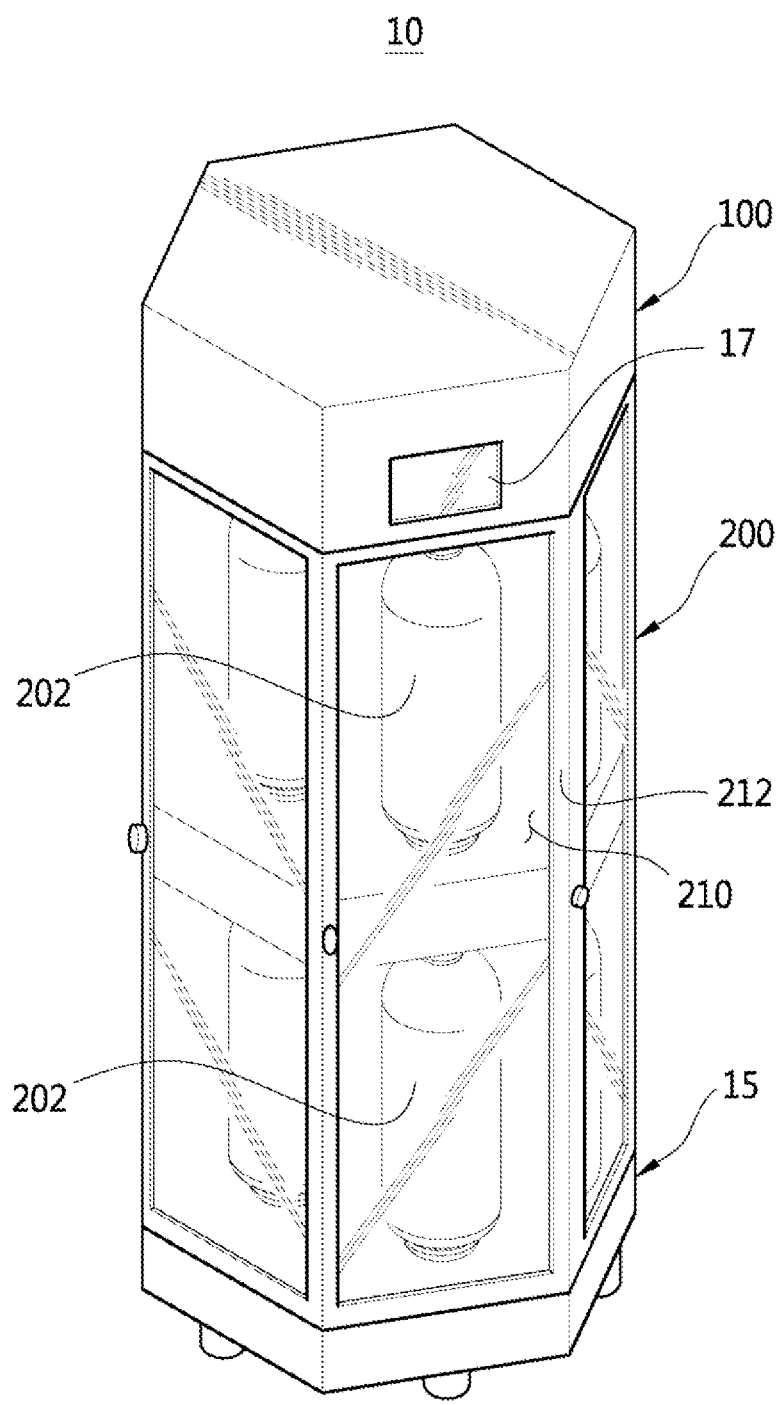
FIG. 1 is a perspective view showing a beer manufacturing apparatus according to an exemplary embodiment of the present disclosure.

Exemplary embodiments of the present disclosure are described in detail so that those of ordinary skill in the art may easily implement the same with reference to the accompanying drawings.

As the exemplary embodiments allow for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

The thicknesses and sizes of components in the accompanying drawings may be exaggerated for clarity of the specification, and thus, the exemplary embodiments are not limited by relative sizes or thicknesses in the accompanying drawings.

Figure 2:
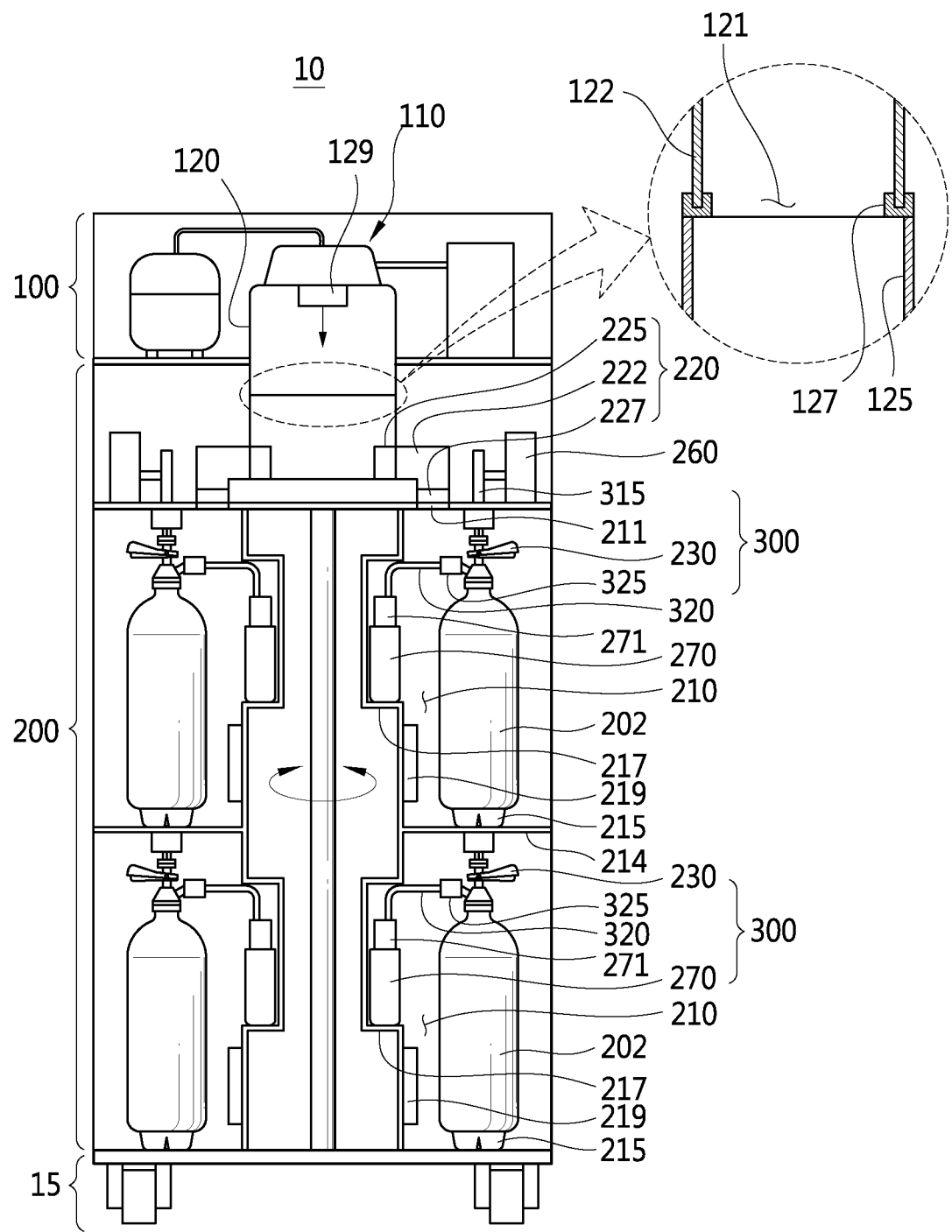
FIG. 2 is a schematic vertical cross-sectional view of the beer manufacturing apparatus of FIG. 1.
Figure 3:
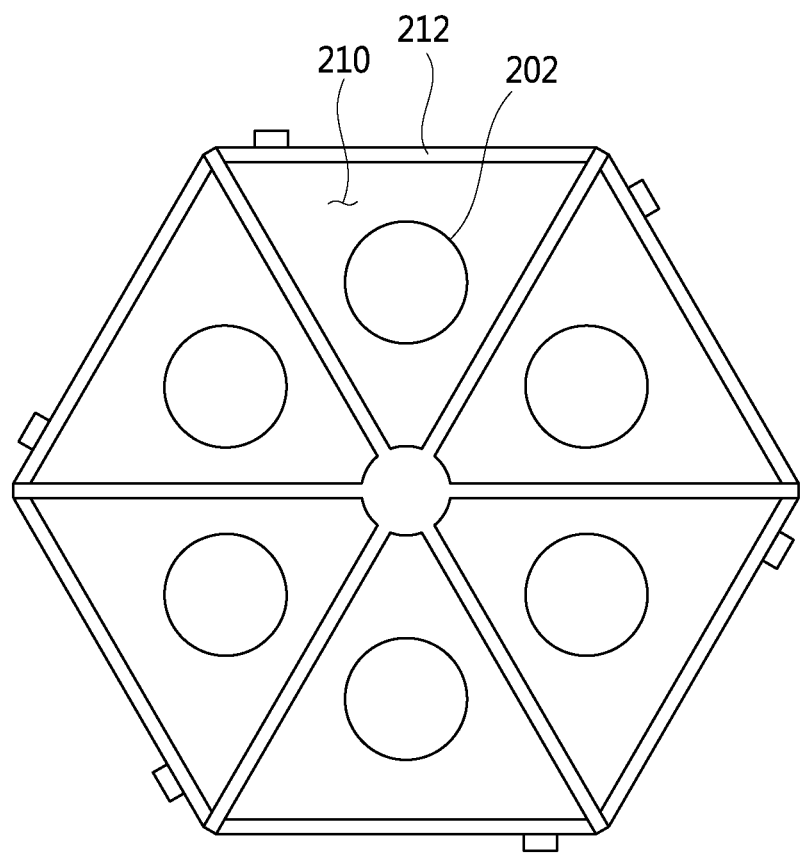
FIG. 3 is a schematic horizontal cross-sectional view of the beer manufacturing apparatus of FIG. 1.

FIG. 1 is a perspective view showing a beer manufacturing apparatus according to an exemplary embodiment of the present disclosure. FIG. 2 is a schematic vertical cross-sectional view of the beer manufacturing apparatus of FIG. 1. FIG. 3 is a schematic horizontal cross-sectional view of the beer manufacturing apparatus of FIG. 1.

Referring to FIGS. 1 to 3, a beer manufacturing apparatus 10 according to an exemplary embodiment of the present disclosure may include a machine room 100 including a cooling device 110 for generating cool air, a fermentation room 200 including a plurality of chambers 210 each having an independent space in which a keg 202 containing wort therein is mounted, and a support 15 for supporting the machine room 100 and the fermentation room 200.

The machine room 100 may include a cool air storage 120 for storing the cool air generated by the cooling device 110, and the fermentation room 200 may include a cool air supply device 220 for supplying the cool air stored in the cool air storage 120 to an internal part of the chamber 210.

The fermentation room 200 may include a fermentation device 300 for fermenting the wort contained in the keg 202 mounted in the chamber 210.

The chamber 210 may have an independent space in which the keg 202 containing the wort therein is mounted and may include a door 212 for sealing the internal part of the chamber 210, in which case temperature inside the chamber 210 may be independently adjusted by the cool air supply device 220, and beer may be manufactured by independently fermenting the wort contained in the keg 202 mounted inside the chamber 210 through the fermentation device 300.

In general, beer needs to be manufactured under conditions such as different fermentation times or different fermentation temperatures depending on types of wort and yeast, and thus, the flavor of manufactured beer may be different due to the different conditions, and in this regard, the beer manufacturing apparatus 10 according to an exemplary embodiment of the present disclosure may include the plurality of chambers 210 for enabling independent temperature adjustment and fermentation, and thus, it may be possible to manufacture various types of beer at one time.

The beer manufacturing apparatus 10 according to an exemplary embodiment of the present disclosure may be installed at a place such as a pub or a bar for selling beer with living yeast, and the keg 202 containing the wort therein may be manufactured and provided from a factory.

For example, in the factory, wort may be prepared, the prepared wort may be sterilized for distribution and storage thereof, the sterilized wort may be contained in the keg 202, the keg 202 may be sealed with a keg cap, and the sealed keg may be distributed to a sale place in which the beer manufacturing apparatus 10 according to the present disclosure is installed, and accordingly, the keg 202 containing the wort therein may be provided.

By simply mounting the sealed the keg 202 containing the wort therein in the chamber 210 in the sale place in which the beer manufacturing apparatus 10 according to the present disclosure is installed, beer with living yeast may be easily manufactured and sold without professional knowledge through a process of automatically fermenting and maturing the wort through the fermentation device 300 in a state in which the keg 202 is sealed, i.e., without being contaminated by contact with the outside.

Although the two kegs 202 are illustrated to be mounted in one chamber 210 according to the present embodiment, one keg 202 may be mounted in one chamber 210, and the present disclosure may not be limited by the number of the kegs 202 mounted in one chamber 210.

However, when the two kegs 202 are mounted in one chamber 210 like in the present embodiment, the fermentation device 300 may also be configured to independently ferment the wort contained in each of the two kegs 202.

The fermentation room 200 may be rotatably installed.

For example, when the fermentation room 200 is positioned above the support 15 and the machine room 100 is positioned above the fermentation room 200 like in the present embodiment, the fermentation room 200 may be rotatably installed between the support 15 and the machine room 100, and to this end, a component for rotating the fermentation room 200, such as a rotating bearing or a rotary damper, may be installed between the fermentation room 200 and the support 15 and between the fermentation room 200 and the machine room 100.

However, the present disclosure is not limited thereto, and the machine room 100 may be positioned above the support 15 and the fermentation room 200 may be positioned above the machine room 100, in which case the fermentation room 200 may be rotatably installed while being positioned above the machine room 100.

As such, when the fermentation room 200 is rotatably installed, a user may conveniently mount the keg 202 in each of the plurality of chambers 210 or may conveniently unmount the keg 202 mounted in each of the plurality of chambers 210 while rotating the fermentation room 200.

As seen from FIG. 3, the plurality of chambers 210 may be partitioned in a circumferential direction thereof. Then, the user may more easily mount and unmount the keg 202 while rotating the fermentation room 200.

According to an exemplary embodiment of the present disclosure, the beer manufacturing apparatus 10 may further include a display 17 that is installed at an approximately upper part, that is, on a front surface of the machine room 100 and displays fermentation progress of the wort contained in the keg 202 mounted in each of the plurality of chambers 210, internal temperature of each of the chambers 210, or the like.

The cooling device 110 may be configured to generate cool air using refrigerant and may include, for example, a compressor, a condenser, an evaporator, or a heat exchanger.

The cool air storage 120 may include a first case 122 and a second case 125 that form a space 121 for storing the cool air generated by the cooling device 110.

The first case 122 may be fixedly positioned in the machine room 100 to receive the cool air generated by the cooling device 110, and the second case 125 may be rotatably installed at the first case 122 and may be rotated together while the fermentation room 200 is rotated.

A gasket 127 for preventing leakage of the cool air stored in the cool air storage 120 due to rotation of the second case 125 may be installed between the first case 122 and the second case 125, and a fan 129 for smoothly supplying the cool air generated by the cooling device 110 to the second case 125 may be installed at an upper part of the first case 122.

The cool air supply device 220 may be connected to the second case 125.

Figure 4:
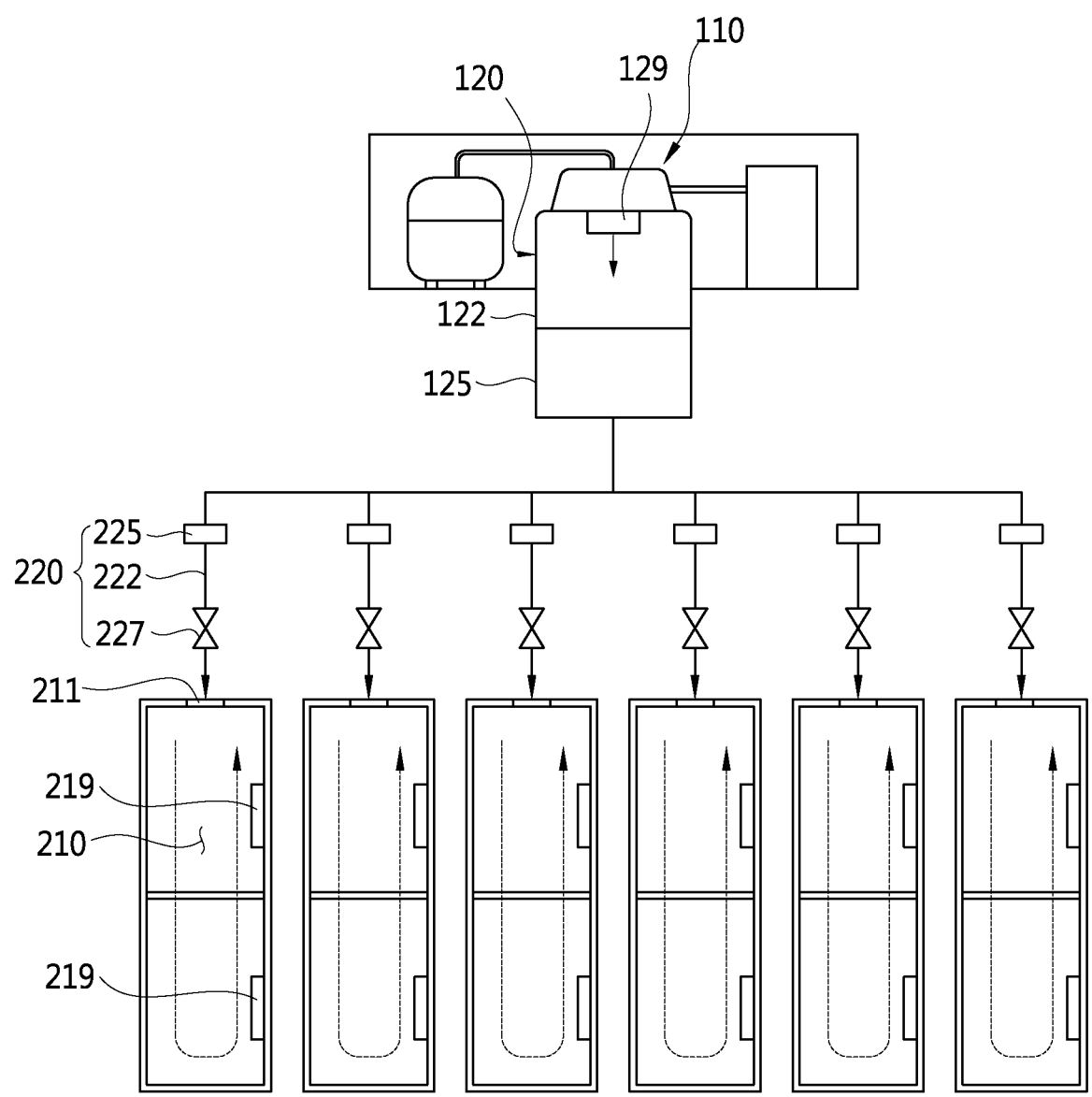
FIG. 4 is a diagram for explaining a cool air supply device according to an exemplary embodiment of the present disclosure.

FIG. 4 is a diagram for explaining a cool air supply device according to an exemplary embodiment of the present disclosure.

As shown in FIG. 4, the cool air supply device 220 according to an exemplary embodiment of the present disclosure may be a component for supplying cool air stored in the cool air storage 120 to each of the plurality of chambers 210, and the fermentation room 200 may include the plurality of cool air supply devices 220, the number of which corresponds to at least the number of the plurality of chambers 210.

The cool air supply device 220 may include a duct 222 that is connected to the second case 125 and connects the cool air storage 120 to the chamber 210, a cool air supply fan 225 for supplying the cool air stored in the cool air storage 120 to the chamber 210 through the duct 222, and a duct open and closer 227 for opening and closing the duct 222.

A cool air supplying inlet 211 connected to the duct 222 may be formed at an upper end of each of the chambers 210, and a heater 219 and temperature sensor (not shown) may be installed inside each of the chambers 210.

Thus, internal temperature of each of the chambers 210 may be independently adjusted by the temperature sensor, the cool air supply device 220, and the heater 219. That is, internal temperature of the chamber 210 may be independently adjusted depending on a degree of fermentation progress of the wort contained the keg 202 mounted in each of the plurality of chambers 210.

Figure 5:
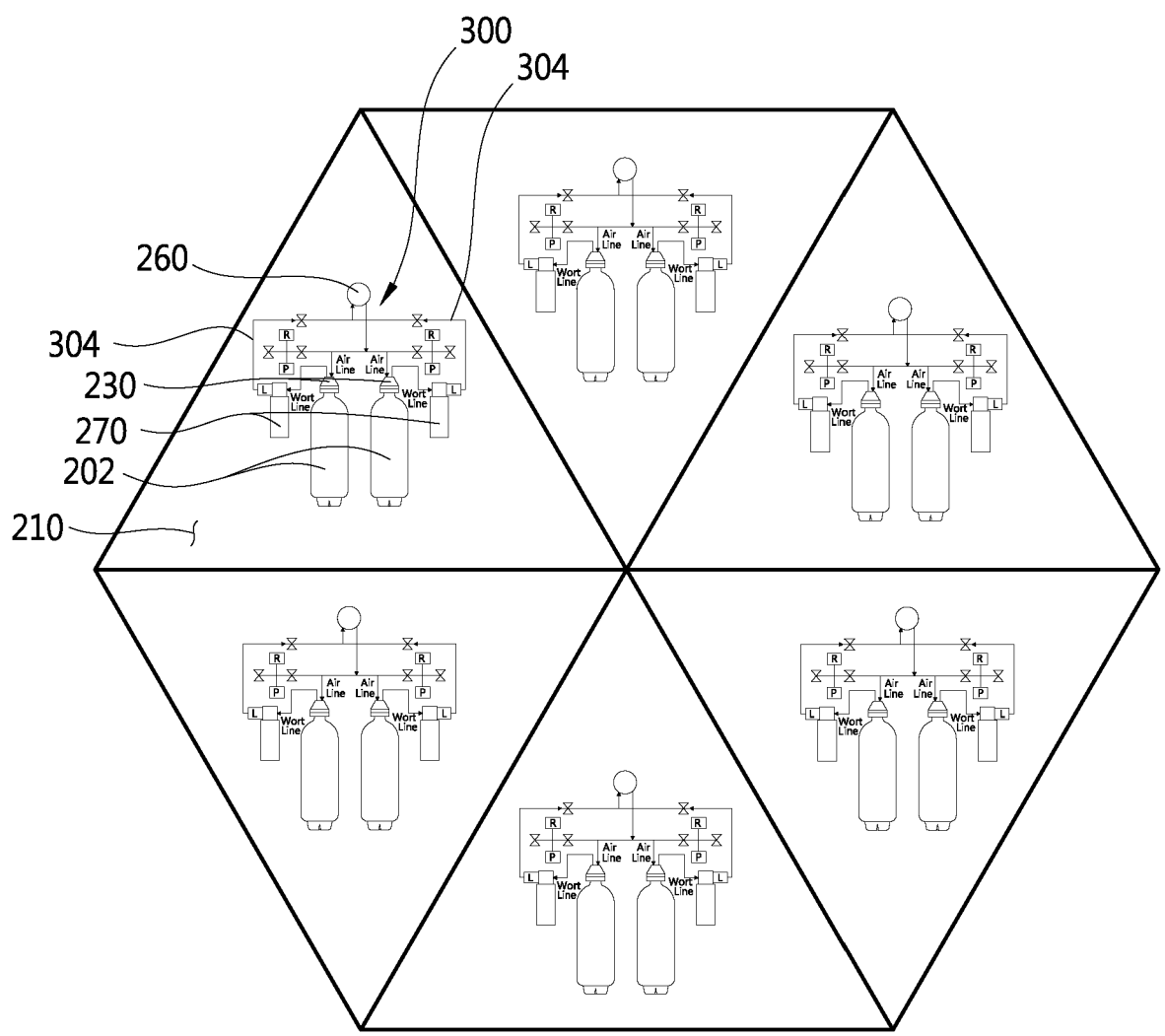
FIG. 5 is a diagram for explaining a fermentation device according to an exemplary embodiment of the present disclosure.
Figure 6:
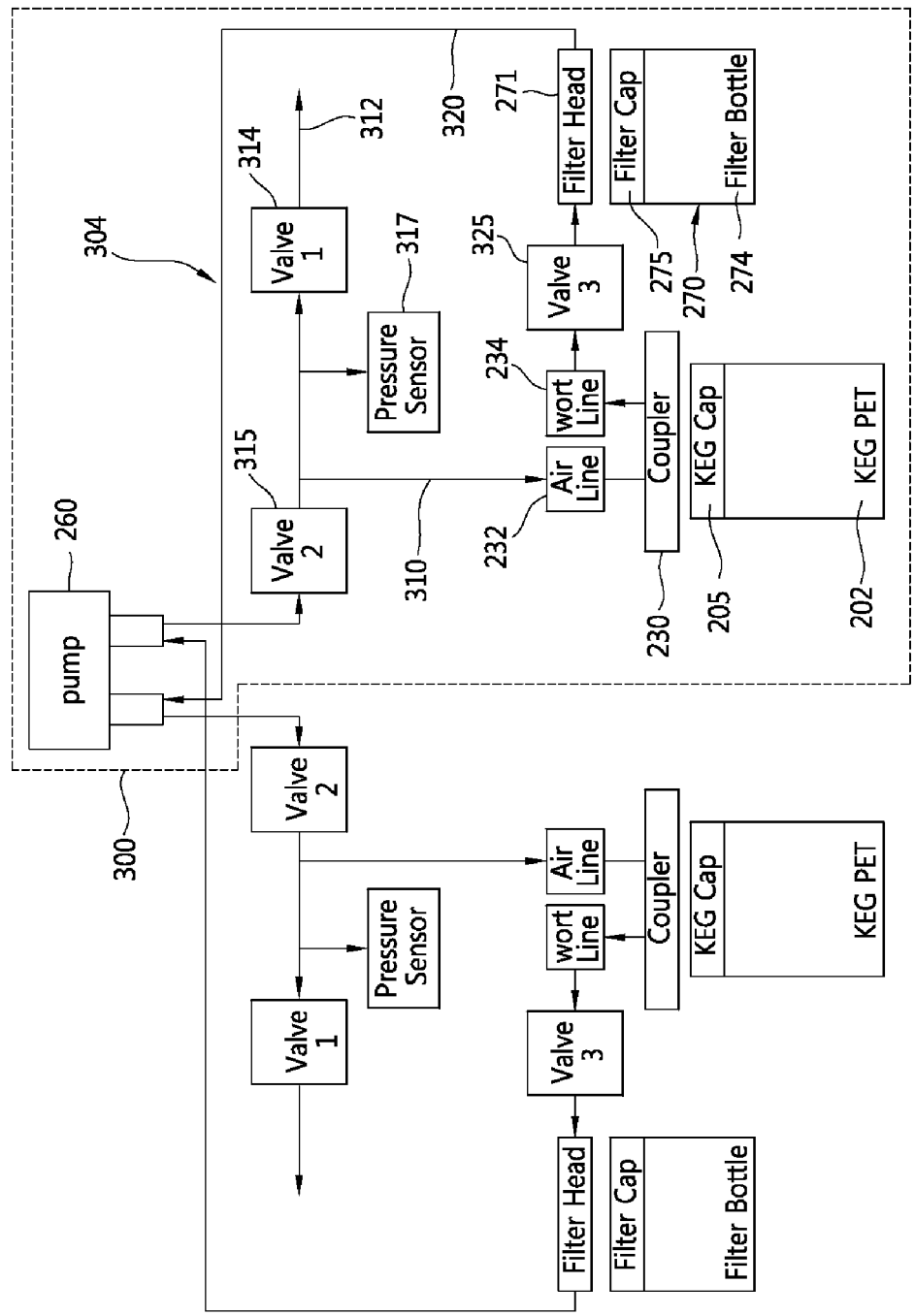
FIG. 6 is a diagram showing the configuration of a fermentation device according to an exemplary embodiment of the present disclosure.

FIG. 5 is a diagram for explaining a fermentation device according to an exemplary embodiment of the present disclosure. FIG. 6 is a diagram showing the configuration of a fermentation device according to an exemplary embodiment of the present disclosure.

As shown in FIG. 5, the fermentation device 300 according to an exemplary embodiment of the present disclosure may be a component for independently fermenting wort contained in the keg 202 mounted in each of the plurality of chambers 210, and the fermentation room 200 may include the plurality of fermentation devices 300, the number of which corresponds to at least the number of the plurality of chambers 210.

The fermentation device 300 may include a coupler 230 to which a keg cap 205 of the keg 202 is coupled, an flow path unit 304 connected to the coupler 230 to form an independent flow path, a filter unit 270 connected to the flow path unit 304, and a pump 260 connected to the flow path unit 304.

As described above, in the present embodiment, the two kegs 202 are mounted in the one chamber 210, in which case the fermentation devices 300 for fermenting the wort contained in the respective kegs 202 share only the pump 260 and may also be independently configured.

That is, in order to independently ferment the wort contained in the two kegs 202 mounted in the one chamber 210, the fermentation device 300 may include the two couplers 230, the two flow channels 304, and the two filter units 270.

Needless to say, the fermentation device 300 may also include the two pumps 260, if one pump 260 is shared like in the present embodiment, the configuration of the fermentation device 300 may be simplified.

The coupler 230 may include an air line 232 and a wort line 234.

The flow path unit 304 may connect the air line 232 and the wort line 234 of the coupler 230 to each other to form an independent flow path.

In detail, the flow path unit 304 may include a first flow path 310 for connecting the air line 232 of the coupler 230 to the pump 260, and a second flow path 320 for connecting the wort line 234 of the coupler 230 to the pump 260.

The flow path unit 304 may include a gas exhaust 312 that is installed in the first flow path 310 and discharges gas generated when the wort contained in the keg 202 is fermented, a first valve 314 for opening and closing the gas exhaust 312, and a second valve 315 that is installed between the gas exhaust 312 and the pump 260 to open and close the first flow path 310.

The first flow path 310 may include a pressure sensor 317 for detecting an internal pressure of the keg 202. The first flow path 310 is connected to an internal part of the keg 202 through the air line 232 of the coupler 230, and thus, even if the pressure sensor 317 is positioned at the first flow path 310, it may be possible to detect the internal pressure of the keg 202.

Although not shown, the gas exhaust 312 may include an air filter for preventing external air from being introduced into the first flow path 310 and from contaminating the same, and may include a machine type relief valve for discharging a pressure when the pressure sensor 317 and the first valve 314 malfunction.

The filter unit 270 may include a filter bottle 274, a filter cap 275 for covering and sealing the filter bottle 274, and a filter head 271 that is connected to the flow path unit 304 and connects an internal part of the filter bottle 274 to the flow path unit 304 when the filter cap 275 is connected to the filter head 271.

The filter bottle 274 may be a sterilization and washing filter bottle containing sterilization and washing water therein for sterilizing and washing the flow path unit 304, may be a smart infusing filter bottle containing a material therein for adding the flavor and aroma of hop or a natural material itself to beer, or may be a yeast supply filter bottle containing yeast to be supplied to the wort contained in the keg 202.

The filter unit 270 may be installed in the second flow path 320 and may be connected to the wort line 234 of the coupler 230.

The flow path unit 304 may further include a third valve 325 that is installed at the second flow path 320 and opens and closes the second flow path 320, and the third valve 325 may be installed between the wort line 234 of the coupler 230 and the filter unit 270.

Figure 7:
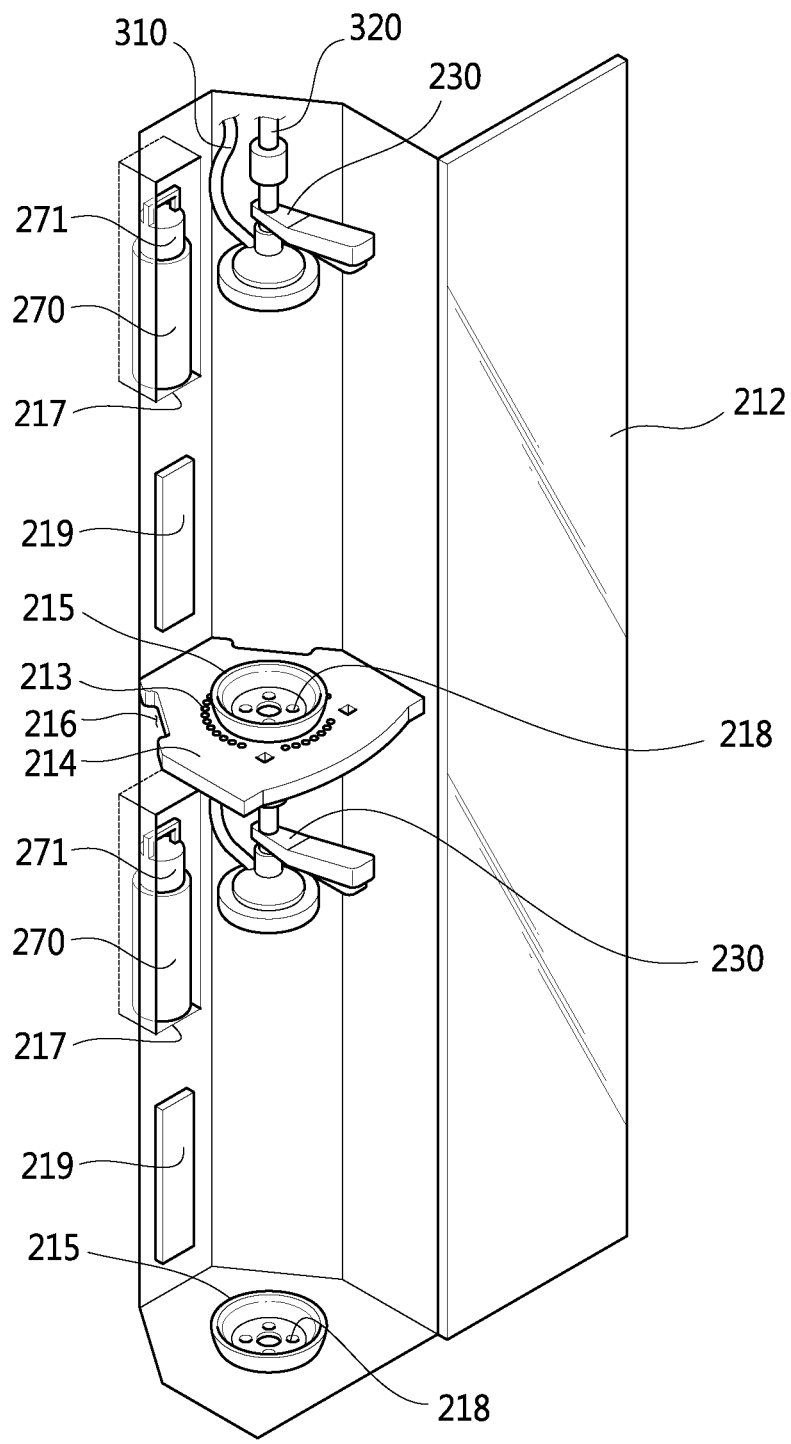
FIG. 7 is a diagram showing an internal part of a chamber of the beer manufacturing apparatus of FIG. 1.
Figure 8:
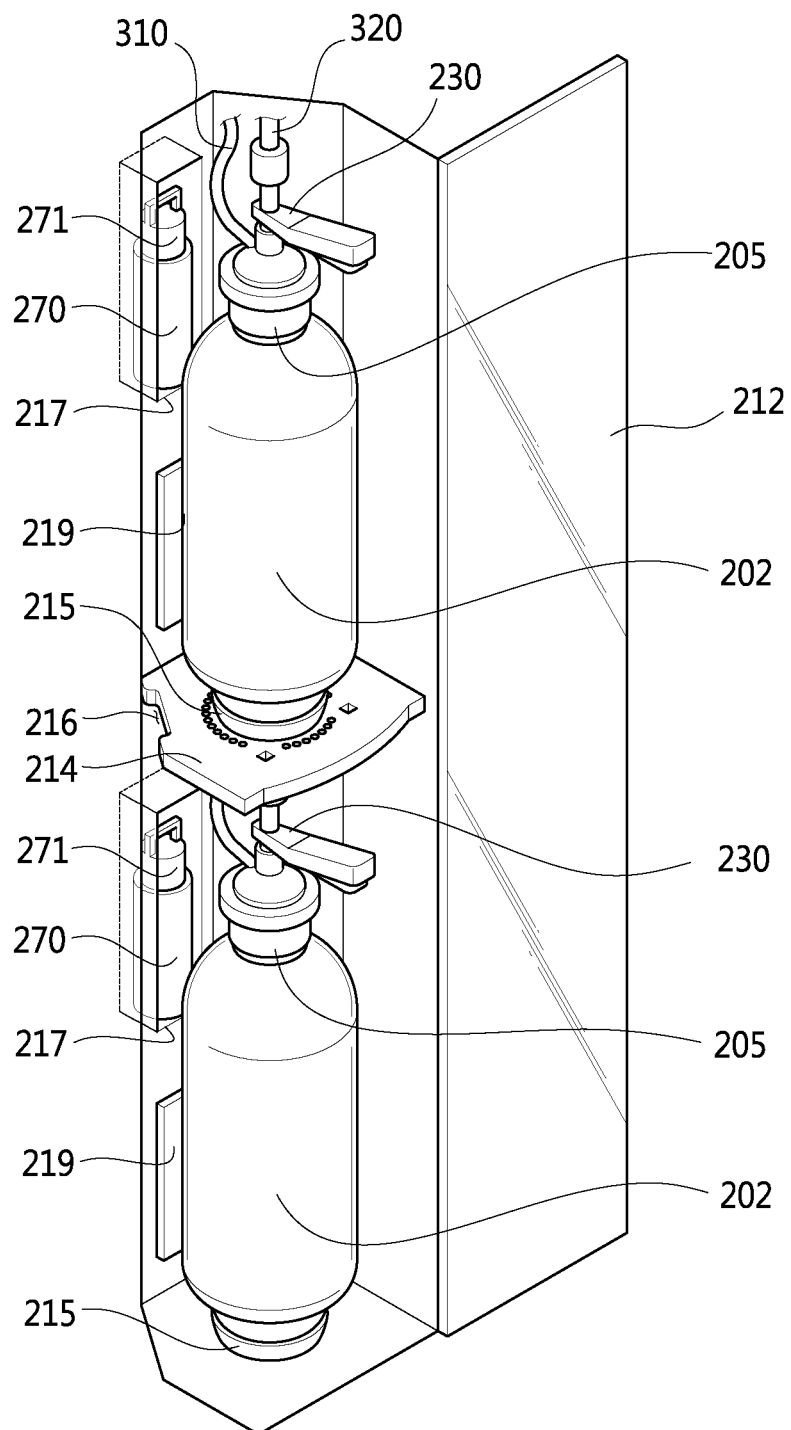
FIG. 8 is a diagram showing a state in which a keg is mounted in the chamber of FIG. 7.
Figure 9:
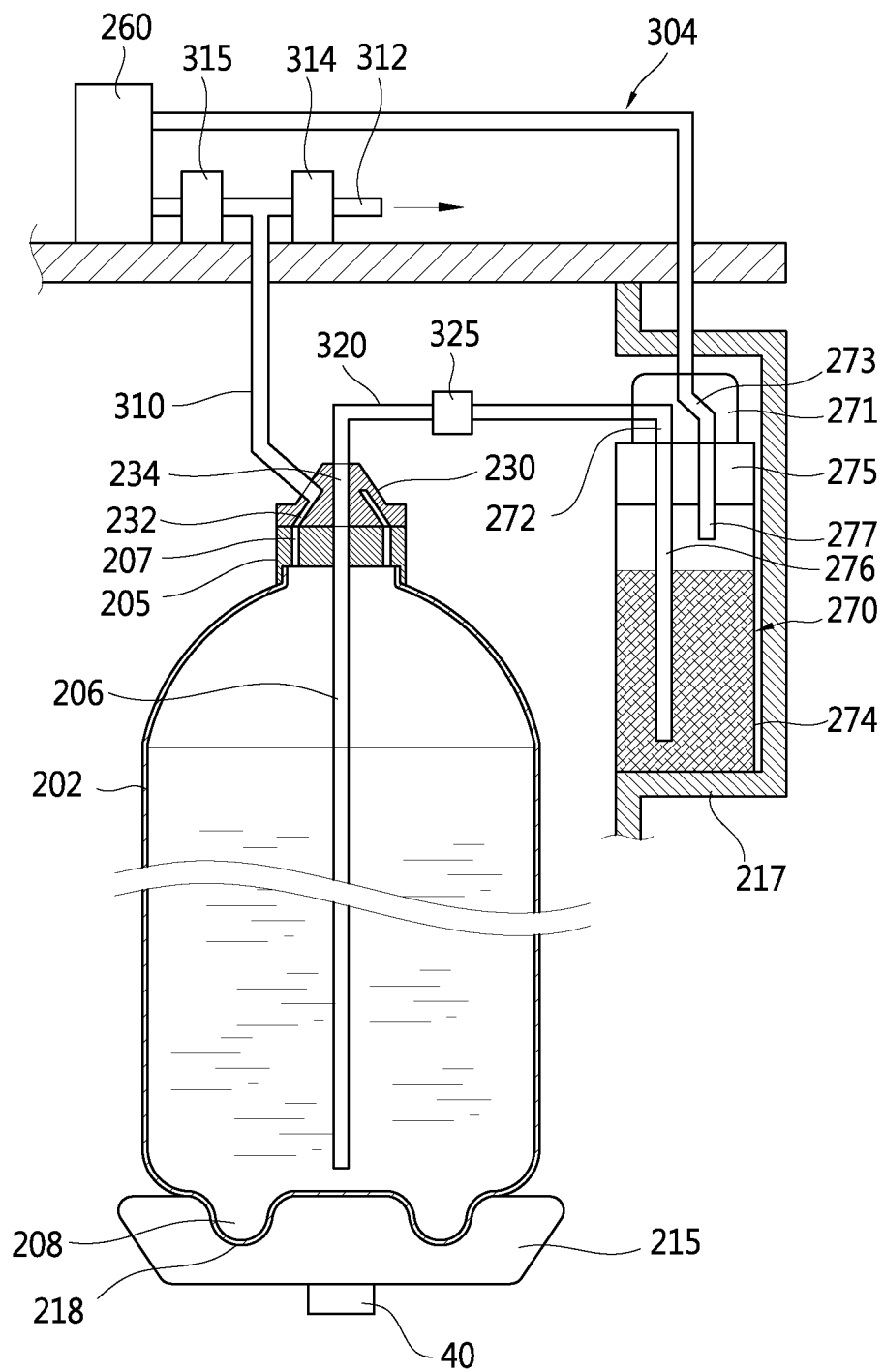
FIG. 9 is a schematic diagram showing an independent flow path unit formed by mounting a keg in the chamber of FIG. 7.

FIG. 7 is a diagram showing an internal part of a chamber of the beer manufacturing apparatus of FIG. 1. FIG. 8 is a diagram showing a state in which a keg is mounted in the chamber of FIG. 7. FIG. 9 is a schematic diagram showing an independent flow path unit formed by mounting a keg in the chamber of FIG. 7.

First, as shown in FIGS. 7 and 8, the chamber 210 may include a support plate 214 for mounting the two kegs 202 thereon, a hole 213 or a gap 216 for smoothly circulating cool air supplied into the chamber 210 in an up and down direction based on the support plate 214 may be formed in the support plate 214, and a keg accommodation unit 215 with the keg 202 accommodated thereon may be installed on the support plate 214 and at a bottom part of the chamber 210.

The coupler 230 may be fixedly installed at an upper end of the chamber 210 and an upper end of the support plate 214 in the chamber 210, the air line 232 of the coupler 230 may be connected to the first flow path 310, and the wort line 234 of the coupler 230 may be fixedly installed while being connected to the second flow path 320.

Although not shown, the coupler 230 may be supported by an elastic member such as a coil spring and may be fixed at the upper end of the chamber 210 or the upper end of the support plate 214 while the height of the coupler 230 is adjustable. Then, as the height of the coupler 230 is easily adjustable depending on the size of the keg 202, it may be convenient to easily couple the keg CAP 205 to the coupler 230 while the keg 202 is accommodated on the keg accommodation unit 215.

As shown in FIG. 9, the keg cap 205 may include a wort hose 206 that is used to discharge wort contained in the keg 202 to the outside of the keg 202 and is formed a long way up to an approximately bottom surface of the keg 202, and the wort hose 206 may be connected to the wort line 234 of the coupler 230 when the keg cap 205 is coupled to the coupler 230.

The keg cap 205 may include a gas exhaust line 207 that is connected to an internal space of the keg 202 and discharges gas generated during fermentation of wort to the outside of the keg 202, and the gas exhaust line 207 may be connected to the air line 232 of the coupler 230 when the keg cap 205 is coupled to the coupler 230.

Then, as the keg cap 205 and the coupler 230 are coupled to each other, the flow path unit 304 may form a closed flow path connected to the first flow path 310, the second flow path 320, the coupler 230, and the keg 202.

Thus, the keg 202 containing the wort therein may be mounted in the chamber 210 by coupling the keg cap 205 to the coupler 230 while the keg 202 containing the wort therein is accommodated on the keg accommodation unit 215 installed in the chamber 210, and as such, when the keg 202 containing the wort therein is mounted in the chamber 210, the wort contained in the keg 202 may be connected to the second flow path 320 through the wort hose 206 and the wort line 234, and as a space of the keg 202 containing the wort therein is connected to the first flow path 310 through the gas exhaust line 207 and the air line 232, the flow path unit 304 may form a closed flow path.

Then, the wort contained in the keg 202 may be pumped by the pump 260 to the second flow path 320 without being contaminated by contact with the outside, and gas generated while the wort contained in the keg 202 is fermented may be discharged to the outside through the first flow path 310 and the gas exhaust 312 without being contaminated by contact with the outside.

A filter accommodation unit 217 for accommodating the filter bottle 274 of the filter unit 270 thereon may be installed at one side of the internal part of the chamber 210, and a filter head 271 may be fixedly installed at an upper part of the filter accommodation unit 217 while being connected to the flow path unit 304.

However, the present disclosure is not limited thereto, and the chamber 210 may not include a separate the filter accommodation unit 217 therein, but instead, the filter bottle 274 may be coupled to the filter head 271 fixedly installed at the upper part of the chamber 210 to be installed in the chamber 210.

As shown in FIG. 9, the filter head 271 may include a first filter line 272 connected to the wort line 234 of the coupler 230, and a second filter line 273 connected to the pump 260, the filter head 271 may be fixedly installed at an upper part of the filter accommodation unit 217 while the first filter line 272 is connected to the wort line 234 of the coupler 230 and the second filter line 273 is connected to the pump 260.

The filter cap 275 may include a first filter hose 276 that is formed a long way up to an approximately bottom surface of the filter bottle 274, and a second filter hose 277 formed shorter than the first filter hose 276, the first filter hose 276 and the second filter hose 277 may be connected to the first filter line 272 and the second filter line 273, respectively, when the filter cap 275 is coupled to the filter head 271.

Thus, the filter cap 275 of the filter bottle 274 may be coupled to the filter head 271 to mount the filter bottle 274 in the chamber 210, and as such, when the filter bottle 274 is installed in the chamber 210, an internal part of the filter bottle 274 may be connected to the wort line 234 of the coupler 230 through the first filter hose 276 and the first filter line 272 and may be connected to the pump 260 through the second filter hose 277 and the second filter line 273.

Then, an appropriate filter bottle for the purpose of the filter unit 270 may be mounted as the filter bottle 274 in the chamber 210, and thus, beer with living yeast may be automatically and easily manufactured from the wort contained in the keg 202 without being contaminated by contact with the outside.

For example, when a sterilization and washing filter bottle containing sterilization and washing water therein is used as the filter bottle 274, the sterilization and washing water contained in the filter bottle 274 may be circulated by the pump 260 in the flow path unit 304, and thus, the flow path unit 304 may be automatically sterilized and washed without being contaminated by contact with the outside.

When a smart infusing filter bottle containing a material therein for infusing the flavor and aroma of hop or a natural material itself is used as the filter bottle 274, the wort contained in the keg 202 may be circulated by the pump 260 in the filter bottle 274, and thus, the flavor and the aroma may be automatically infused into beer without being contaminated by contact with the outside.

When a yeast supply filter bottle containing yeast for fermenting wort therein is used as the filter bottle 274, the wort contained in the keg 202 may be circulated by the pump 260 in the filter bottle 274, and thus, the yeast may be automatically supplied to the wort without being contaminated by contact with the outside.

As shown in FIG. 9, the keg accommodation unit 215 on which the keg 202 is accommodated may include a weight sensor 40.

The weight sensor 40 may be used to measure a change in weight of the keg 202 depending on a degree of fermentation progress of the wort contained in the keg 202 and may be a load cell that is attachable to a lower end of the keg accommodation unit 215.

Guide units 208 and 218 for guiding the keg 202 to be accommodated at an accurate position of the keg accommodation unit 215 may be formed at an upper part of the keg accommodation unit 215 and a lower part of the keg 202. For example, a protrusion 208 having a predetermined shape may be formed at the lower part of the keg 202, and a protrusion groove 218 having a shape corresponding to the shape of the protrusion 208 to allow the protrusion 208 to fit therein may be formed at the upper part of the keg accommodation unit 215.

Then, as the keg 202 is accommodated at an accurate position of the keg accommodation unit 215, the keg 202 may be accommodated at an accurate position corresponding to the center of the weight sensor 40 included in the keg accommodation unit 215, and accordingly, a measurement error of a weight change that occurs when the keg 202 is accommodated to be inclined to the weight sensor 40 may be minimized, and a weight change based on fermentation progress of the wort contained in the keg 202 may be more accurately measured.

Figure 10:
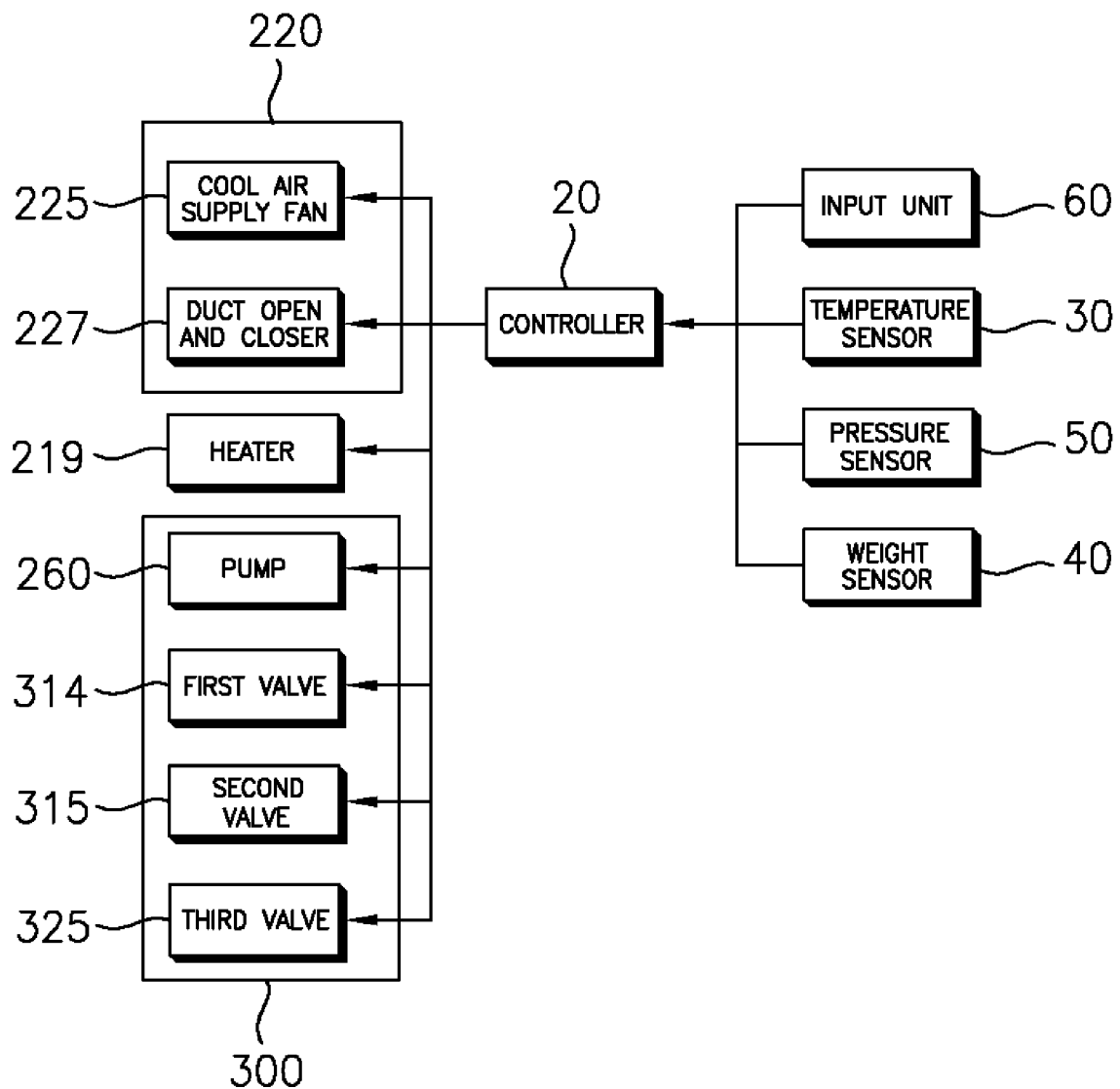
FIG. 10 is a diagram showing a configuration of a beer manufacturing apparatus according to an exemplary embodiment of the present disclosure.

FIG. 10 is a diagram showing a configuration of a beer manufacturing apparatus according to an exemplary embodiment of the present disclosure.

Referring to FIG. 10, the beer manufacturing apparatus 10 according to an exemplary embodiment of the present disclosure may include a controller 20 that controls the cool air supply device 220 to adjust an internal temperature of each of the plurality of chambers 210 and controls the fermentation device 300 to independently ferment the wort contained in the keg 202 mounted in each of the plurality of chambers 210.

The beer manufacturing apparatus 10 according to an exemplary embodiment of the present disclosure may include an input unit 60 to which a detailed fermentation condition such as a fermentation time or a fermentation time of the wort contained in the keg 202.

The input unit 60 may be configured to allow a user to directly input information and may include a scanner for reading information stored in the form of a bar code or a quick response (QR) code.

For example, a bar code or a QR code for storing information on a type of the wort contained in the keg 202, a type of used yeast, a fermentation condition, whether the flavor or aroma of hop or a natural material itself is added, or a type of the material if the flavor or the aroma is added may be formed at an upper end of the keg cap 205, and the input unit 60 may be configured in the form of a scanner for recognizing the bar code or QR code formed at the upper code of the keg cap 205.

Thus, the controller 20 may control the cool air supply fan 225 and the duct open and closer 227 of the cool air supply device 220 and the heater 219 included in the chamber 210 based on information input through the input unit 60, a temperature detected by a temperature sensor 30 installed in the chamber 210, and a measurement value of a weight change of the keg 202, detected by the weight sensor 40, and thus, may independently adjust an internal temperature of each of the plurality of chambers 210 depending on a degree of the fermentation progress of the wort contained in the keg 202.

The controller 20 may the pump 260, the first valve 314, the second valve 315, and the third valve 325 of the fermentation device 300 based on information input through the input unit 60, a pressure detected by the pressure sensor 317, and a measurement value of a weight change of the keg 202, detected by the weight sensor 40, and thus, may independently ferment the wort contained in the keg 202 mounted in each of the plurality of chambers 210.

In the beer manufacturing apparatus according to an exemplary embodiment of the present disclosure as configured above, beer with living yeast may be automatically manufactured rather than being contaminated by contact with the outside without professional knowledge by simply mounting the keg 202 that contains wort, which is manufactured, provided, and sealed by a factory, in the chamber 210, and a plurality of chambers for independently adjusting a temperature and independently fermenting wort are installed, and accordingly, various types of beer may be manufactured at one time.

Hereinafter, a method of manufacturing beer using a beer manufacturing apparatus according to the present disclosure will be described in detail.

Figure 11:
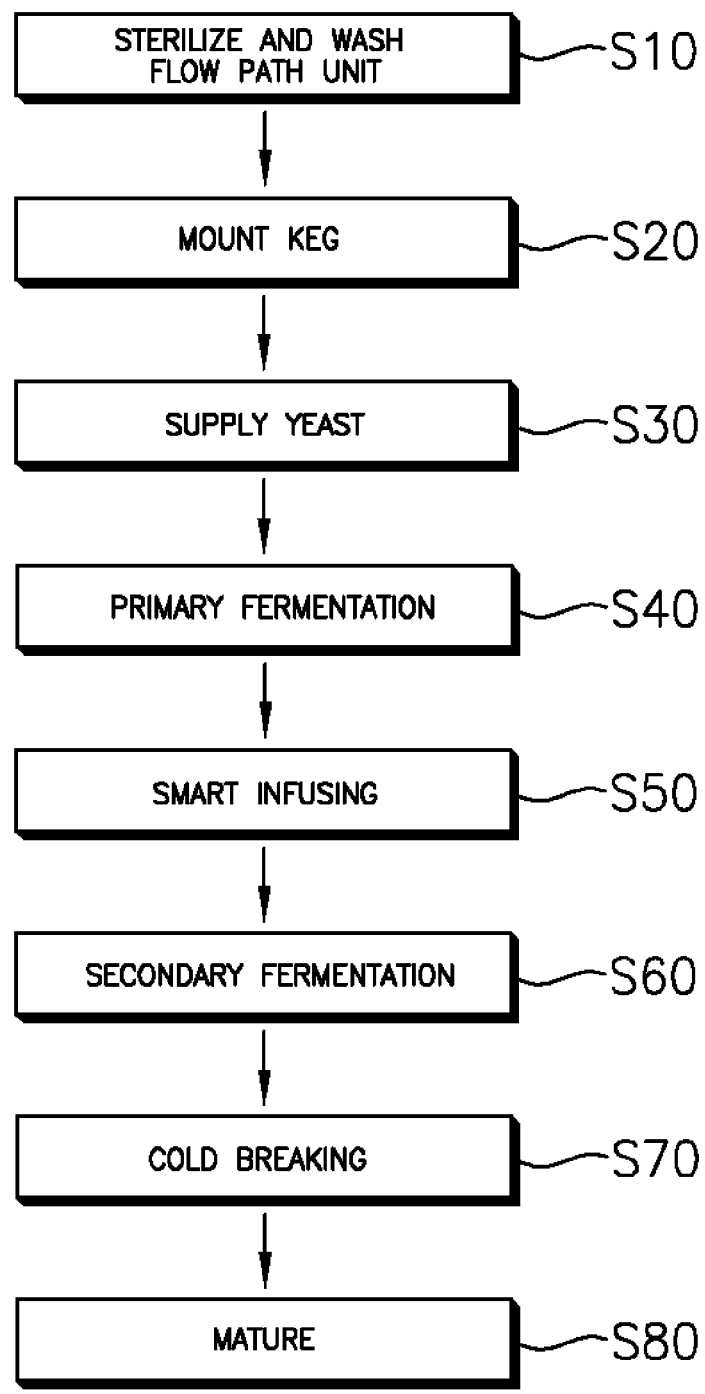
FIG. 11 is a flowchart showing a beer manufacturing method using a beer manufacturing apparatus according to an exemplary embodiment of the present disclosure.

FIG. 11 is a flowchart showing a beer manufacturing method using a beer manufacturing apparatus according to an exemplary embodiment of the present disclosure.

Referring to FIG. 11, the beer manufacturing method using the beer manufacturing apparatus 10 according to an exemplary embodiment of the present disclosure may include a sterilization and washing operation (S10) of the flow path unit 304, an mounting operation (S20) of the keg 202, a yeast supplying operation (S30), a primary fermentation operation (S40), a smart infusing operation (S50), a secondary fermentation operation (S60), a cold breaking operation (S70), and a maturing operation (S80).

The sterilization and washing operation (S10) of the flow path unit 304 may be an operation of sterilizing and washing the flow path unit 304 for connecting the wort line 234 and the air line 232 of the coupler 230 that is fixedly installed in the chamber 210 before the keg 202 containing the wort therein is mounted in the chamber 210 and may be performed by using a sterilization and washing filter bottle containing sterilization and washing water therein as the filter bottle 274 of the filter unit 270.

The mounting operation (S20) of the keg 202 may be an operation of coupling the keg cap 205 of the keg 202 containing the wort therein to the coupler 230 to connect an internal part of the keg 202 containing the wort therein to the sterilized and washed flow path unit 304, in which case an internal space of the keg 202 may be connected to the first flow path 310 through the gas exhaust line 207 and the air line 232 and the wort contained in the keg 202 may be connected to the second flow path 320 through the wort hose 206 and the wort line 234 by coupling the keg cap 205 to the coupler 230 while the keg 202 containing the wort therein on the keg accommodation unit 215 installed in the chamber 210.

The yeast supplying operation (S30) may be an operation of supplying yeast for fermenting the wort contained in the keg 202 mounted in the chamber 210 and may be performed by using a yeast supply filter bottle containing yeast for fermenting wort therein as the filter bottle 274 of the filter unit 270.

The primary fermentation operation (S40) may be an operation of discharging gas generated when the wort contained in the keg 202 is fermented by opening the gas exhaust 312 installed in the flow path unit 304.

When yeast is supplied to the wort contained in the keg 202, fermentation may immediately begin, and when fermentation begins, gas may be generated while the yeast supplied into the keg 202 is activated and alcohol is actively generated, and in this regard, the primary fermentation operation (S40) may be an operation of discharging gas to the outside for a predetermined time after fermentation begins, in which case the controller 20 may close the second valve 315 and the third valve 325 and may open the first valve 314 to discharge gas generated from the inside of the keg 202 to the outside through the gas exhaust 312 for a predetermined time after fermentation begins.

The smart infusing operation (S50) may be an operation of infusing the flavor and aroma of hop or a natural material itself into beer and may be performed by using a smart infusing filter bottle containing a material for infusing the flavor and the aroma therein as the filter bottle 274 of the filter unit 270.

The secondary fermentation operation (S60) may be an operation of naturally carbonizing the primarily fermented wort using gas generated while the wort contained in the keg 202 is fermented by closing the gas exhaust 312, in which case the controller 20 may close the first valve 314 to prevent gas generated in the keg 202 from being discharged to the outside through the gas exhaust 312.

The cold breaking operation (S70) may be an operation of precipitating precipitates such as sugary rice, protein, or yeast mixed in secondarily fermented beer on a bottom of the keg 202 by lowering the internal temperature of the chamber 210 at about 2° C. or less.

The maturing operation (S80) may be an operation of maturing the beer on which operations up to the cold breaking operation (S70) is completely performed and maintaining the internal temperature of the chamber 210 for a preset predetermined time while maintaining a preset predetermined temperature.

Hereinafter, a method of sterilization and washing operation of an flow path unit using a beer manufacturing apparatus according to an exemplary embodiment of the present disclosure will be described in detail with reference to the accompanying drawings.

The sterilization and washing operation (S10) of the flow path unit 304 may be an operation of previously sterilizing and washing the flow path unit 304 before the keg 202 containing wort therein is mounted in the chamber 210 and the wort is fermented.

Figure 12:
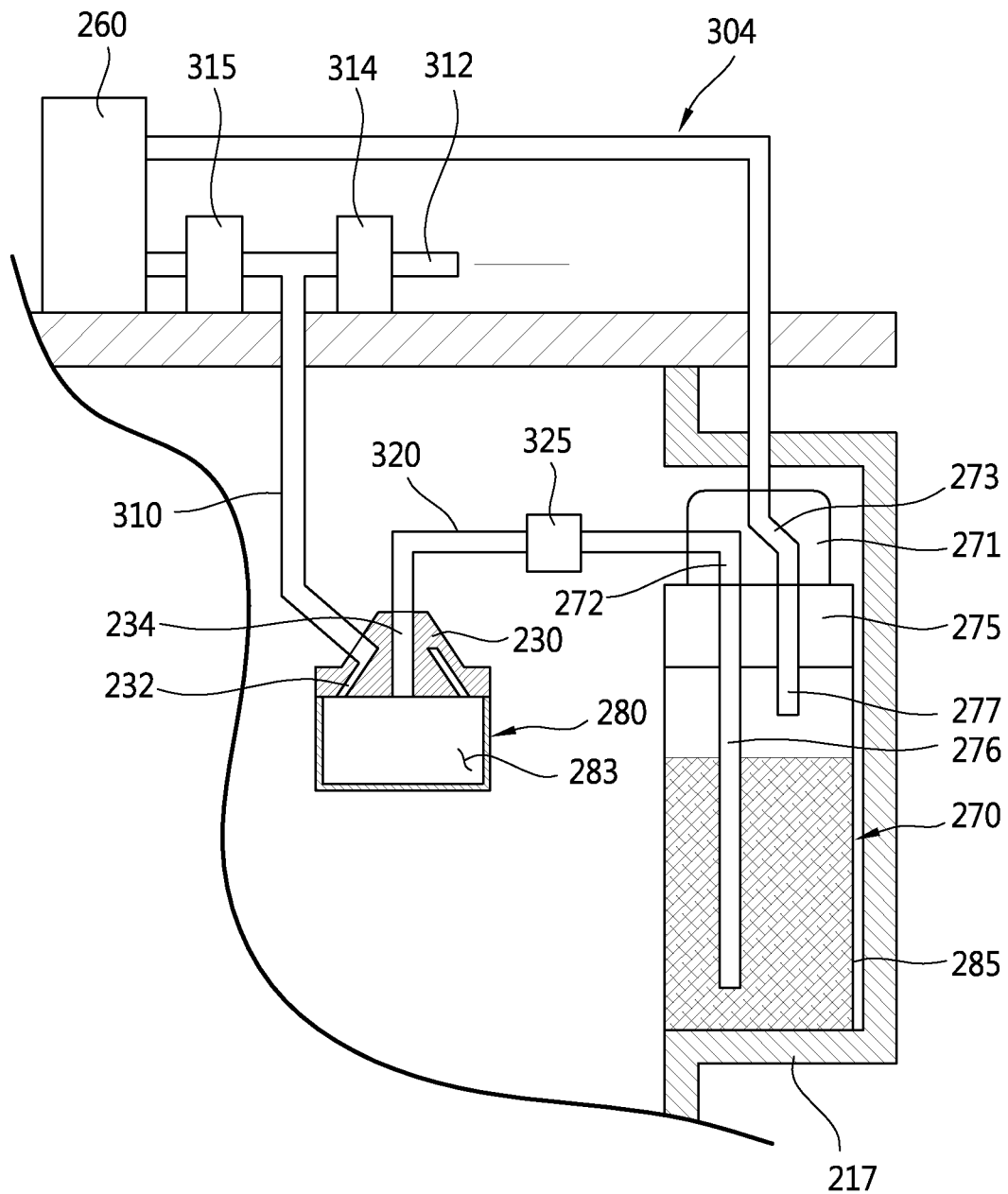
FIGS. 12 to 14 are diagrams for explaining a sterilization and washing operation of an flow path unit using a beer manufacturing apparatus according to an exemplary embodiment of the present disclosure.
Figure 13:
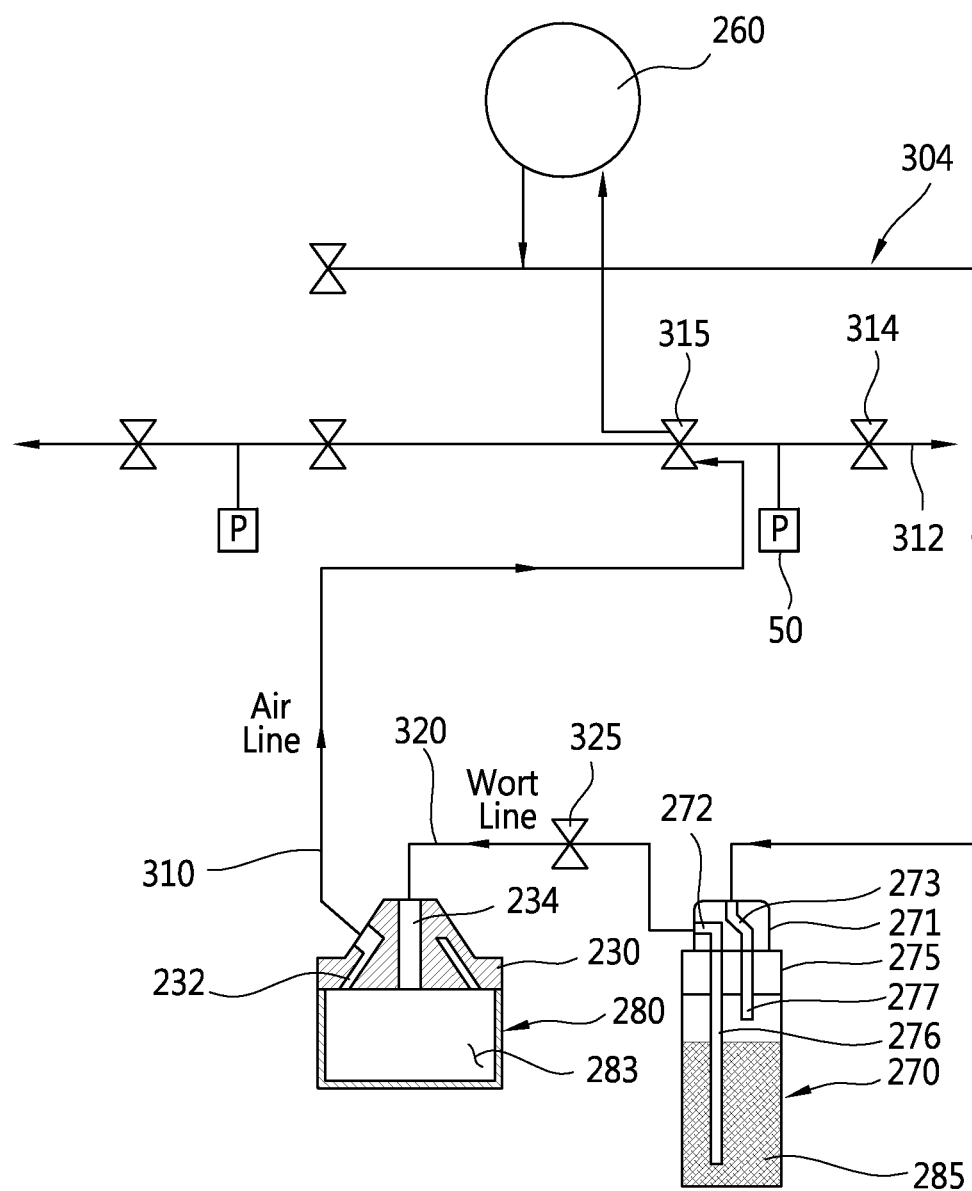
Figure 14:
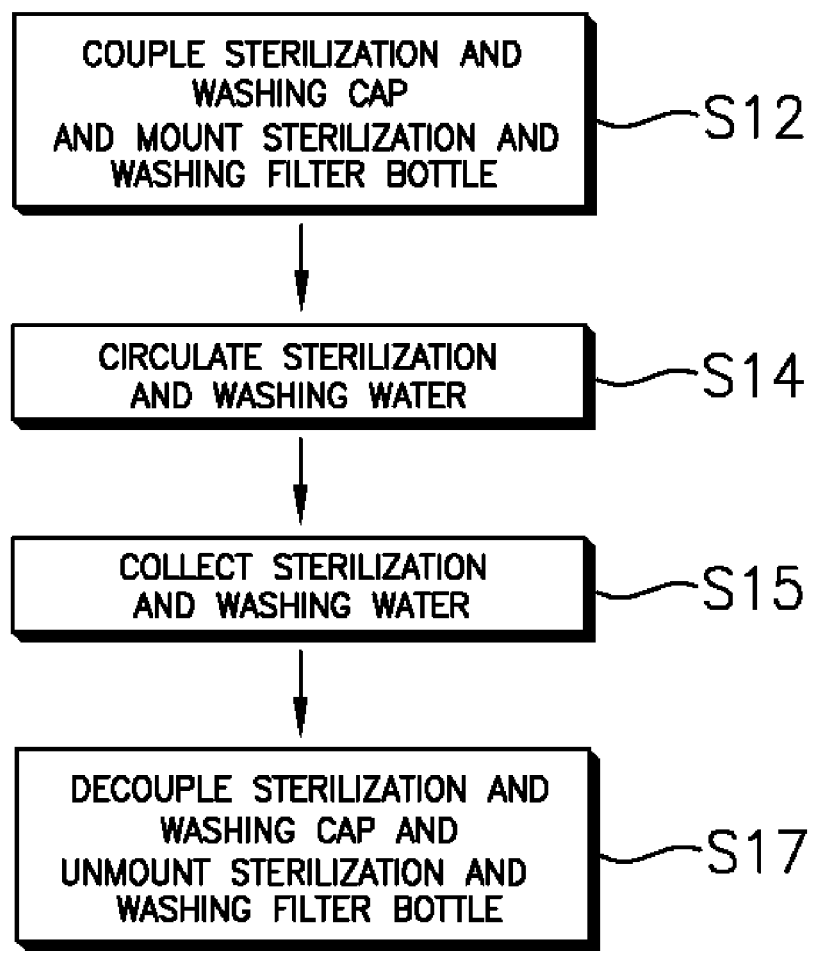

FIGS. 12 to 14 are diagrams for explaining a sterilization and washing operation of an flow path unit using a beer manufacturing apparatus according to an exemplary embodiment of the present disclosure. FIG. 12 is a schematic diagram showing a state in which a sterilization and washing cap is coupled to a coupler. FIG. 13 is a schematic diagram showing a state in which sterilization and washing water is circulated in an flow path unit. FIG. 14 is a flowchart showing the sterilization and washing operation of an flow path unit using a beer manufacturing apparatus according to an exemplary embodiment of the present disclosure.

Referring to FIGS. 12 and 13, the beer manufacturing apparatus 10 according to an exemplary embodiment of the present disclosure for automatically sterilizing and washing the flow path unit 304 before the keg 202 is mounted in the chamber 210 may further include a sterilization and washing cap 280 that is coupled to the coupler 230 to form the flow path unit 304 as a closed flow path.

That is, the beer manufacturing apparatus 10 according to an exemplary embodiment of the present disclosure for automatically sterilizing and washing the flow path unit 304 may include the chamber 210, the coupler 230 that is fixedly installed in the chamber 210 and includes the wort line 234 and the air line 232, the flow path unit 304 for connecting the wort line 234 and the air line 232 of the coupler 230 to each other, the sterilization and washing cap 280 that is coupled to the coupler 230 to form the flow path unit 304 as a closed flow path, a sterilization and washing filter bottle 285 that is connected to the flow path unit 304 and contains sterilization and washing water therein, the pump 260 connected to the flow path unit 304, and the controller 20 for controlling an operation of the pump 260 to circulate the sterilization and washing water contained in the sterilization and washing filter bottle 285 in the flow path unit 304 formed as a closed flow path.

The sterilization and washing cap 280 may include a space 283 for connecting the wort line 234 and the air line 232 when being coupled to the coupler 230.

Then, one sides of the wort line 234 and the air line 232 of the coupler 230 that the wort line 234 and the air line 232 penetrate may be connected to each other by the flow path unit 304, and the other sides of the wort line 234 and the air line 232 may be connected to each other by the sterilization and washing cap 280, and accordingly, the flow path unit 304 may form a closed flow path.

The flow path unit 304 may include the first flow path 310 for connecting the air line 232 of the coupler 230 and the pump 260 to each other, the second flow path 320 for connecting the wort line 234 of the coupler 230 and the pump 260 to each other, the gas exhaust 312 installed in the first flow path 310, the first valve 314 for opening and closing the gas exhaust 312, and the second valve 315 that is installed between the gas exhaust 312 and the pump 260 to open and close the first flow path 310.

The sterilization and washing filter bottle 285 may be connected to the second flow path 320.

The flow path unit 304 may further include the third valve 325 that is installed between the wort line 234 of the coupler 230 and the sterilization and washing filter bottle 285 to open and close the second flow path 320.

The chamber 210 may include the filter head 271 that is fixedly installed while being connected to the second flow path 320 and connects an internal part of the sterilization and washing filter bottle 285 and the second flow path 320 to each other when the filter cap 275 of the sterilization and washing filter bottle 285 is coupled to the filter head 271.

The filter head 271 may include the first filter line 272 connected to the wort line 234 of the coupler 230 and the second filter line 273 connected to the pump 260.

The filter cap 275 may include the first filter hose 276 that is formed a long way up to an internal bottom surface of the sterilization and washing filter bottle 285 to discharge almost the entire sterilization and washing water contained in the sterilization and washing filter bottle 285 to the outside, and the second filter hose 277 connected to an internal space of the sterilization and washing filter bottle 285 so as not to reach a water surface of the sterilization and washing water contained in the sterilization and washing filter bottle 285.

When the filter cap 275 is coupled to the filter head 271, the first filter hose 276 of the filter cap 275 may be connected to the first filter line 272 of the filter head 271, and the second filter hose 277 of the filter cap 275 may be connected to the second filter line 273 of the filter head 271.

The pump 260 may be a pump that is capable of being driven in opposite directions, for example, in clockwise and counterclockwise directions.

Then, the controller 20 may control a driving direction of the pump 260, and thus, may circulate the sterilization and washing water contained in the sterilization and washing filter bottle 285 in the flow path unit 304 formed as a closed flow path and then collect the sterilization and washing water to the sterilization and washing filter bottle 285.

Referring to FIG. 14, the sterilization and washing operation (S10) of the flow path unit 304 according to an exemplary embodiment of the present disclosure may include a sterilization and washing cap coupling and sterilization and washing filter bottle mounting operation (S12) of coupling the sterilization and washing cap 280 to the coupler 230 to form the flow path unit 304 as a closed flow path and connecting the sterilization and washing filter bottle 285 to the flow path unit 304, a sterilization and washing water circulating operation (S14) of circulating the sterilization and washing water, contained in the sterilization and washing filter bottle 285, in the flow path unit 304 formed as a closed flow path for a predetermined time by operating the pump 260 connected to the flow path unit 304, a sterilization and washing water collecting operation (S15) of collecting the circulated sterilization and washing water to the sterilization and washing filter bottle 285 by operating the pump 260 in an opposite direction, and a sterilization and washing cap decoupling and sterilization and washing filter bottle unmounting operation (S17) of decoupling the sterilization and washing cap 280 coupled to the coupler 230 and unmounting the sterilization and washing filter bottle 285 connected to the flow path unit 304.

For example, the sterilization and washing water circulation operation (S14) may be performed by operating the pump 260 in a counterclockwise direction by the controller 20.

As shown in FIG. 13, when the pump 260 is driven in a counterclockwise direction, the sterilization and washing water contained in the sterilization and washing filter bottle 285 may be pumped to the flow path unit 304 and may be circulated clockwise in the flow path unit 304 along the first filter hose 276 formed a long way up to an internal bottom surface of the sterilization and washing filter bottle 285 and then may be re-collected to the sterilization and washing filter bottle 285 through the second filter hose 277, and accordingly, the sterilization and washing water contained in the sterilization and washing filter bottle 285 may be continuously circulated in the flow path unit 304 by operating the pump 260 in a counterclockwise direction.

In this case, the sterilization and washing water collecting operation (S15) may be performed by operating the pump 260 by the controller 20 in an opposite direction to the driving direction in the sterilization and washing water circulation operation (S14), that is, in a counterclockwise direction.

As such, when the pump 260 is driven clockwise, the sterilization and washing water may be circulated counterclockwise, and in this case, the second filter hose 277 does not reach a surface of the sterilization and washing water, and thus, in a state in which the sterilization and washing water in the sterilization and washing filter bottle 285 is not pumped to the flow path unit 304 any longer, only the sterilization and washing water that remains in the flow path unit 304 may be collected to the sterilization and washing filter bottle 285.

As described above, in the beer manufacturing apparatus 10 and the sterilizing and washing operation (S10) of the flow path unit 304 using the same according to an exemplary embodiment of the present disclosure for automatically sterilizing and washing the flow path unit 304, the sterilization and washing cap 280 may be previously coupled to the coupler 230 to form the flow path unit 304 as a closed flow path before the keg 202 containing wort therein is coupled to the coupler 230, the sterilization and washing filter bottle 285 containing the sterilization and washing water may be connected to the flow path unit 304, and then, the sterilization and washing water may be circulated in the flow path unit 304 formed as a closed flow path by operating the pump 260, and accordingly, the flow path unit 304 may be automatically sterilized and washed before the keg 202 is mounted being contaminated by contact with the outside.

Hereafter, a smart infusing method using a beer manufacturing apparatus according to an exemplary embodiment of the present disclosure will be described in detail with reference to the accompanying drawings.

The smart infusing operation (S50) may be an operation of infusing the flavor and aroma of hop or a natural material itself in to wort, and may be selectively performed according to a recipe of beer as a manufacture target when the beer is manufactured using the beer manufacturing apparatus 10 according to the present disclosure.

Here, smart infusing refers to automatic infusion of the flavor and aroma of hop or a natural material itself into wort and includes dry hopping of adding hop in order to strengthen the flavor of beer.

Figure 15:
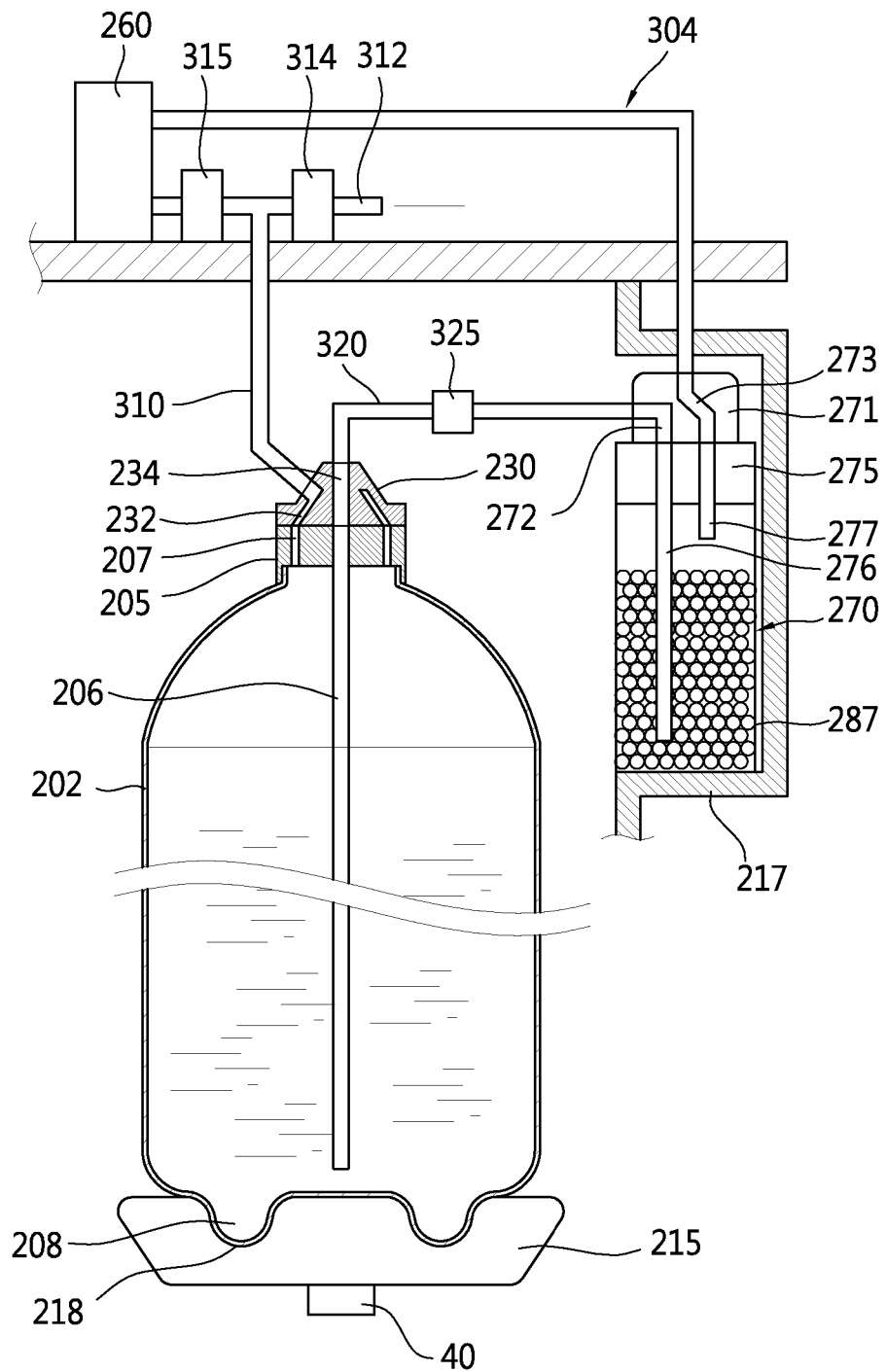
FIGS. 15 to 18 are diagrams for explaining a smart infusing method using a beer manufacturing apparatus according to an exemplary embodiment of the present disclosure.
Figure 16:
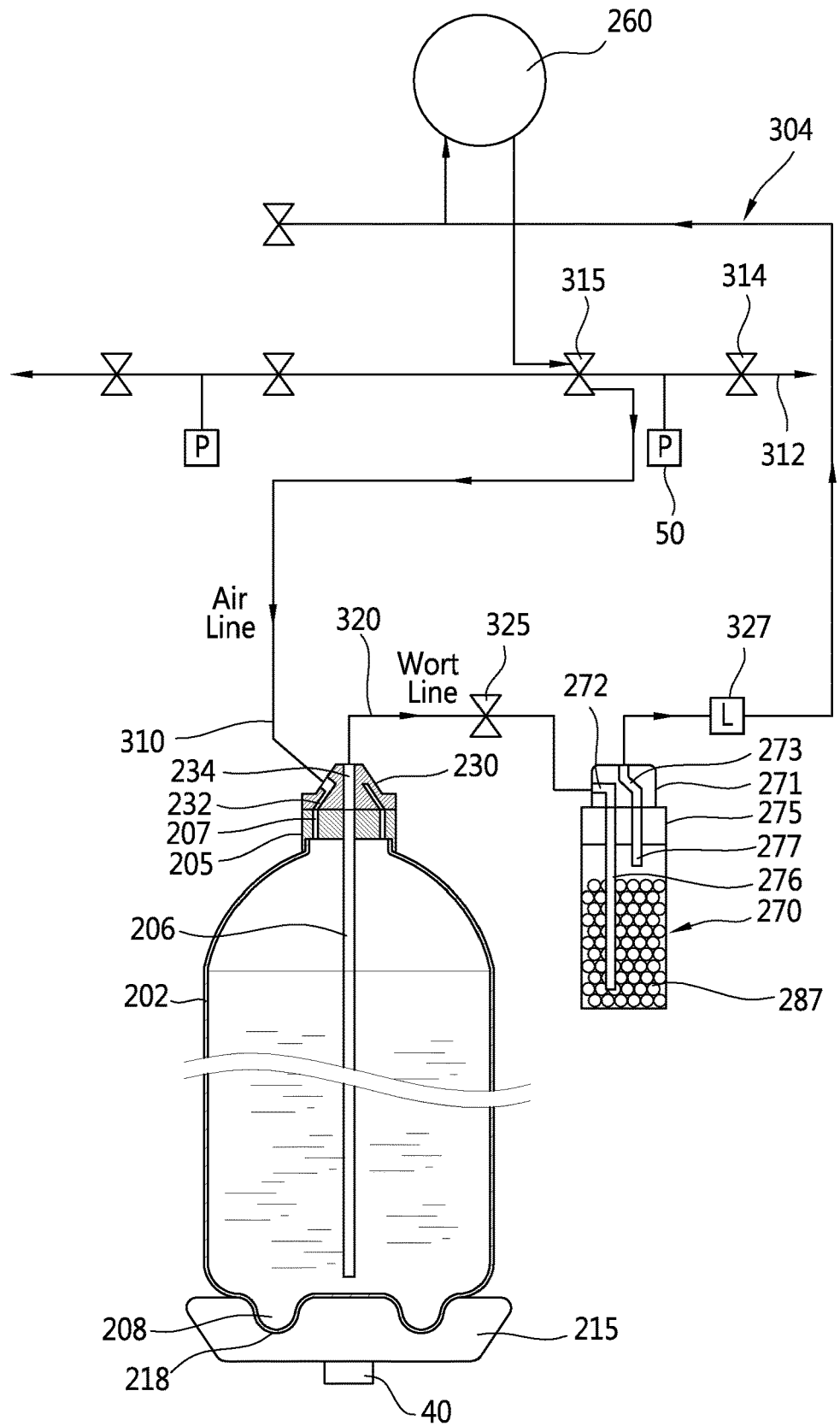
Figure 17:
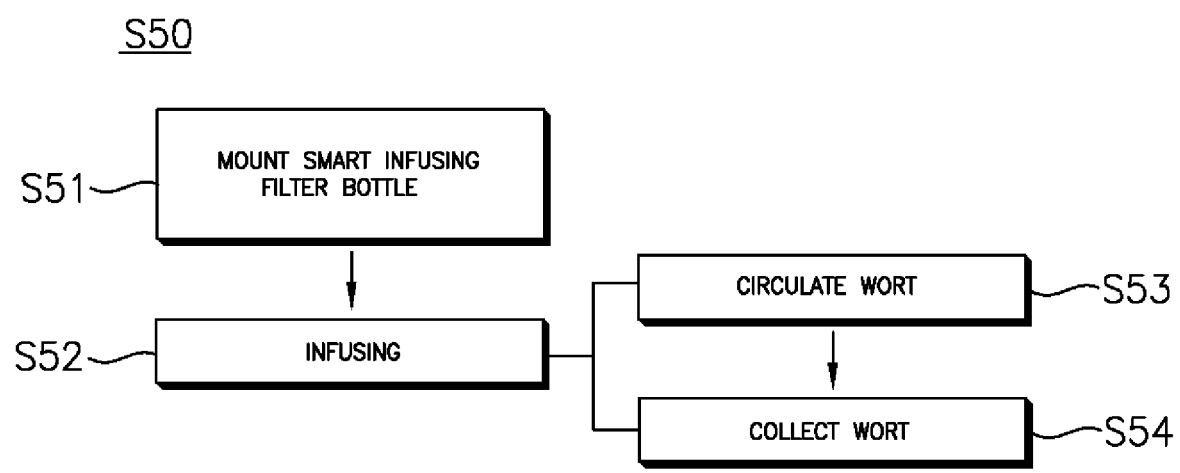
Figure 18:
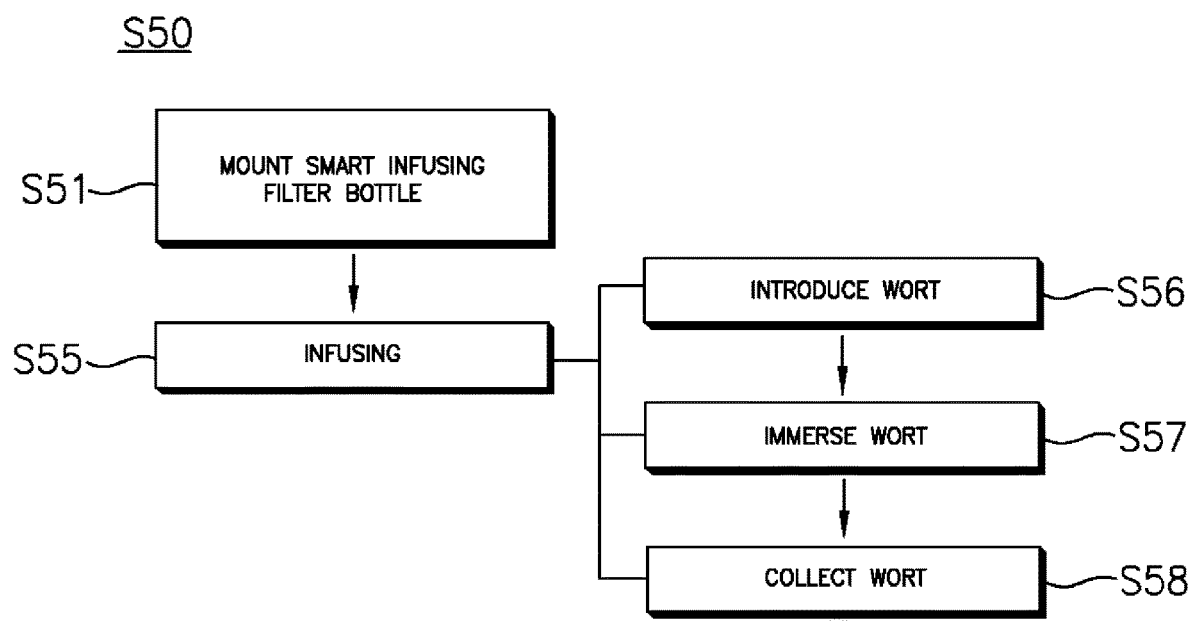

FIGS. 15 to 18 are diagrams for explaining a smart infusing method using a beer manufacturing apparatus according to an exemplary embodiment of the present disclosure. FIG. 15 is a schematic diagram showing a state in which a keg containing wort therein is coupled to a coupler. FIG. 16 is a schematic diagram showing a state in which wort contained in a keg is circulated in an flow path unit. FIG. 17 is a flowchart showing a smart infusing method according to an exemplary embodiment of the present disclosure. FIG. 18 is a flowchart showing a smart infusing method according to another exemplary embodiment of the present disclosure.

Referring to FIGS. 15 and 16, the beer manufacturing apparatus 10 for smart infusing according to an exemplary embodiment of the present disclosure may include the chamber 210, the coupler 230 fixedly installed in the chamber 210 and including the wort line 234 and the air line 232, the flow path unit 304 for connecting the wort line 234 and the air line 232 of the coupler 230 to each other, the keg 202 that is mounted in the chamber 210 and contains wort while the keg 202 is coupled to the coupler 230 to be connected to the flow path unit 304, a smart infusing filter bottle 287 connected to the flow path unit 304 and containing a material for infusing flavor and aroma into the wort contained in the keg 202, the pump 260 connected to the flow path unit 304, and the controller 20 for controlling an operation of the pump 260 to infuse the material contained in the smart infusing filter bottle 287 into the wort contained in the keg 202.

Here, the material contained in the smart infusing filter bottle 287 may be a material for infusing flavor and aroma into the wort contained in the keg 202, for example, hop, orange peel, a piece of oak wood, or vanilla.

When the keg 202 containing wort therein is coupled to the coupler 230 and is connected to the flow path unit 304, one sides of the wort line 234 and the air line 232 of the coupler 230 that the wort line 234 and the air line 232 penetrate may be connected to each other by the flow path unit 304, and the other sides of the wort line 234 and the air line 232 may be connected to each other by the keg 202 containing the wort therein, and accordingly, the flow path unit 304 may form a closed flow path.

The flow path unit 304 may include the first flow path 310 for connecting the air line 232 of the coupler 230 and the pump 260 to each other, the second flow path 320 for connecting the wort line 234 of the coupler 230 and the pump 260 to each other, the gas exhaust 312 installed in the first flow path 310, the first valve 314 for opening and closing the gas exhaust 312, and the second valve 315 that is installed between the gas exhaust 312 and the pump 260 to open and close the first flow path 310.

The smart infusing filter bottle 287 may be connected to the second flow path 320.

The flow path unit 304 may further include the third valve 325 that is installed between the wort line 234 of the coupler 230 and the smart infusing filter bottle 287 to open and close the second flow path 320.

The keg 202 may include the keg cap 205 that seals an internal part of the keg 202 and is coupled to the coupler 230 to connect the internal part of the keg 202 to the flow path unit 304.

The keg cap 205 may include the wort hose 206 that is formed a long way up to an internal bottom surface of the keg 202 to discharge almost the entire wort contained in the keg 202 to the outside, and the gas exhaust line 207 connected to an internal space of the keg 202 to externally discharge gas generated when the wort contained in the keg 202 is fermented.

When the keg cap 205 is coupled to the coupler 230, the wort hose 206 of the keg cap 205 may be connected to the wort line 234 of the coupler 230, and the gas exhaust line 207 of the keg cap 205 may be connected to the air line 232 of the coupler 230.

The chamber 210 may include the filter head 271 that is fixedly installed while being connected to the second flow path 320 and connects an internal part of the smart infusing filter bottle 287 and the second flow path 320 to each other when the filter head 271 when the filter cap 275 of the smart infusing filter bottle 287 is coupled to the filter head 271.

The filter head 271 may include the first filter line 272 connected to the wort line 234 of the coupler 230 and the second filter line 273 connected to the pump 260.

The filter cap 275 may include the first filter hose 276 that is formed a long way up to an internal bottom surface of the smart infusing filter bottle 287 to collect almost the entire wort introduced into the smart infusing filter bottle 287, and the second filter hose 277 connected to an internal space of the smart infusing filter bottle 287 to fill the material contained in the smart infusing filter bottle 287 into the wort introduced into the smart infusing filter bottle 287.

When the filter cap 275 is coupled to the filter head 271, the first filter hose 276 of the filter cap 275 may be connected to the first filter line 272 of the filter head 271, and the second filter hose 277 of the filter cap 275 may be connected to the second filter line 273 of the filter head 271.

The pump 260 may be a pump that is capable of being driven in opposite directions, for example, in clockwise and counterclockwise directions.

Then, the controller 20 may control a driving direction of the pump 260, and thus, may introduce the wort contained in the keg 202 into the smart infusing filter bottle 287 and may then re-collect the wort to the keg 202.

The controller 20 may control an operation of the pump 260 to introduce the wort contained in the keg 202 into the smart infusing filter bottle 287, and thus, may infuse the flavor and aroma of the material contained in the smart infusing filter bottle 287 into the wort contained in the keg 202.

For example, the controller 20 may control the operation of the pump 260 to circulate the wort contained in the keg 202 in the flow path unit 304 or may also control the operation of the pump 260 to repeatedly perform a process in which the wort contained in the keg 202 is immersed in the material contained in the smart infusing filter bottle 287 for a predetermined time and then is re-collected to the keg 202.

A level sensor 327 may be installed between the smart infusing filter bottle 287 and the pump 260.

Then, when the level sensor 327 detects wort, if the controller 20 stops an operation of the pump 260, wort introduced into the smart infusing filter bottle 287 may be maintained to be immersed in the material contained in the smart infusing filter bottle 287, and thus, the material contained in the smart infusing filter bottle 287 may be infused into the wort introduced into the smart infusing filter bottle 287.

Referring to FIG. 17, the smart infusing operation (S50) according to an exemplary embodiment of the present disclosure may include a smart infusing filter bottle mounting operation (S51) of connecting the smart infusing filter bottle 287 to the flow path unit 304, and an infusing operation (S52) of infusing a material contained in the smart infusing filter bottle 287 into the wort contained in the keg 202 by operating the pump 260 connected to the flow path unit 304.

Here, the filter bottle mounting operation (S51) may be performed after the flow path unit sterilization and washing operation (S10) or after the yeast supplying operation (S30).

For example, when the yeast supplying operation (S30) is performed using a yeast supply filter bottle as the filter bottle 274 of the filter unit 270, the filter bottle mounting operation (S51) may be performed after the yeast supplying operation (S30) is performed, that is, after the yeast supply filter bottle is unmounted.

When a yeast supply filter bottle is not used as the filter bottle 274 of the filter unit 270 during the yeast supplying operation (S30), the filter bottle mounting operation (S51) may be performed after the flow path unit sterilization and washing operation (S10) is performed, that is, the sterilization and washing filter bottle 285 is mounted.

The infusing operation (S52) may include a wort circulating operation (S53) of circulating the wort contained in the keg 202 in the flow path unit 304 for a predetermined time by operating the pump 260, and a wort collecting operation (S54) of collecting the circulated wort into the keg 202 by operating the pump 260 in an opposite direction.

For example, the wort circulating operation (S53) may be performed by operating the pump 260 clockwise by the controller 20.

As shown in FIG. 16, when the pump 260 is driven clockwise, the wort contained in the keg 202 may be pumped to the flow path unit 304, may be circulated counterclockwise, and may then re-collected to the keg 202 through the gas exhaust line 207 by the wort hose 206 formed a long way up to an internal bottom surface of the keg 202, and thus, the wort contained in the keg 202 may be continuously circulated counterclockwise in the flow path unit 304 by operating the pump 260 clockwise.

Then, a predetermined amount of a portion of wort circulated in the flow path unit 304 may always be maintained to be immersed in the material contained in the smart infusing filter bottle 287, and thus, the flavor and aroma of the material contained in the smart infusing filter bottle 287 may be infused into the wort circulated in the flow path unit 304.

In this case, the wort collecting operation (S54) may be performed by operating the pump 260 in an opposite direction to the driving operation in the wort circulating operation (S53), that is, in a counterclockwise direction by the controller 20.

As such, when the pump 260 is driven counterclockwise, wort may be circulated clockwise in the flow path unit 304, and in this case, the first filter hose 276 of the filter cap 275 almost reaches a bottom surface of the smart infusing filter bottle 287, and thus, the wort introduced into the smart infusing filter bottle 287 may be collected to the keg 202, and in contrast, the gas exhaust line 207 of the keg cap 205 does not reach the wort contained in the keg 202, and thus, as the wort collected to the keg 202 may not be pumped to the flow path unit 304 any longer, only wort introduced into the smart infusing filter bottle 287 and the wort remaining in the flow path unit 304 may be collected to the keg 202.

FIG. 18 is a flowchart showing a smart infusing operation according to another embodiment of the present disclosure.

Referring to FIG. 18, the smart infusing operation (S50) according to the present embodiment is different from that of the above embodiment in terms of only the infusing operation (S52), and thus, hereinafter, only a description thereof will be given.

An infusing operation (S55) according to the present embodiment may include a wort introducing operation (S56) of introducing the wort contained in the keg 202 into the smart infusing filter bottle 287 by operating the pump 260, a wort immersing operation (S57) of maintaining a state in which the wort is immersed in a material contained in the smart infusing filter bottle 287 for a predetermined time by stopping an operation of the pump 260 when the wort is filled in the smart infusing filter bottle 287, and a wort collecting operation (S58) of collecting the wort immersed in the material the smart infusing filter bottle 287 to the keg 202 by operating the pump 260 in an opposite direction.

The infusing operation (S55) may be performed by sequentially repeating the wort introducing operation (S56), the wort immersing operation (S57), and the wort collecting operation (S58).

Whether wort is filled in the smart infusing filter bottle 287 may be determined in the wort immersing operation (S57) by detecting wort by the level sensor 327 installed between the smart infusing filter bottle 287 and the pump 260.

For example, when wort is detected by the level sensor 327, the controller 20 may determine that wort is filled in the smart infusing filter bottle 287 and may stop an operation of the pump 260.

The infusing operations (S52 and S55) may be performed in the middle of the primary fermentation operation (S40) and may be performed just before the secondary fermentation operation (S60) from a predetermined time before the secondary fermentation operation (S60) starts.

The gas exhaust 312 is open in the primary fermentation operation (S40) and the gas exhaust 312 is closed in the secondary fermentation operation (S60), and thus, flavor and aroma that are infused into wort in the infusing operations (S52 and S55) may be prevented from going away to the outside through the gas exhaust 312 by performing the infusing operations (S52 and S55) just before the secondary fermentation operation (S60).

As described above, when the beer manufacturing apparatus 10 for smart infusing according to an exemplary embodiment of the present disclosure and the smart infusing operation (S50) using the same are used, flavor and aroma may be automatically and easily infused into beer without being contaminated by contact with the outside.

Hereinafter, a beer manufacturing apparatus according to another exemplary embodiment of the present disclosure will be described in detail.

As described above, yeast may be supplied to the wort contained in the keg 202 mounted in the chamber 210 using the filter unit 270, but when yeast is supplied using the filter unit 270, if impurities of the yeast remains in the second flow path 320, this may not be appropriate for sanitary reasons, and it may be inconvenient that, after the yeast is supplied using the filter unit 270, the yeast supply filter bottle is unmounted from the filter unit 270 and then the smart infusing filter bottle 287 is mounted on the filter unit 270 again.

Figure 19:
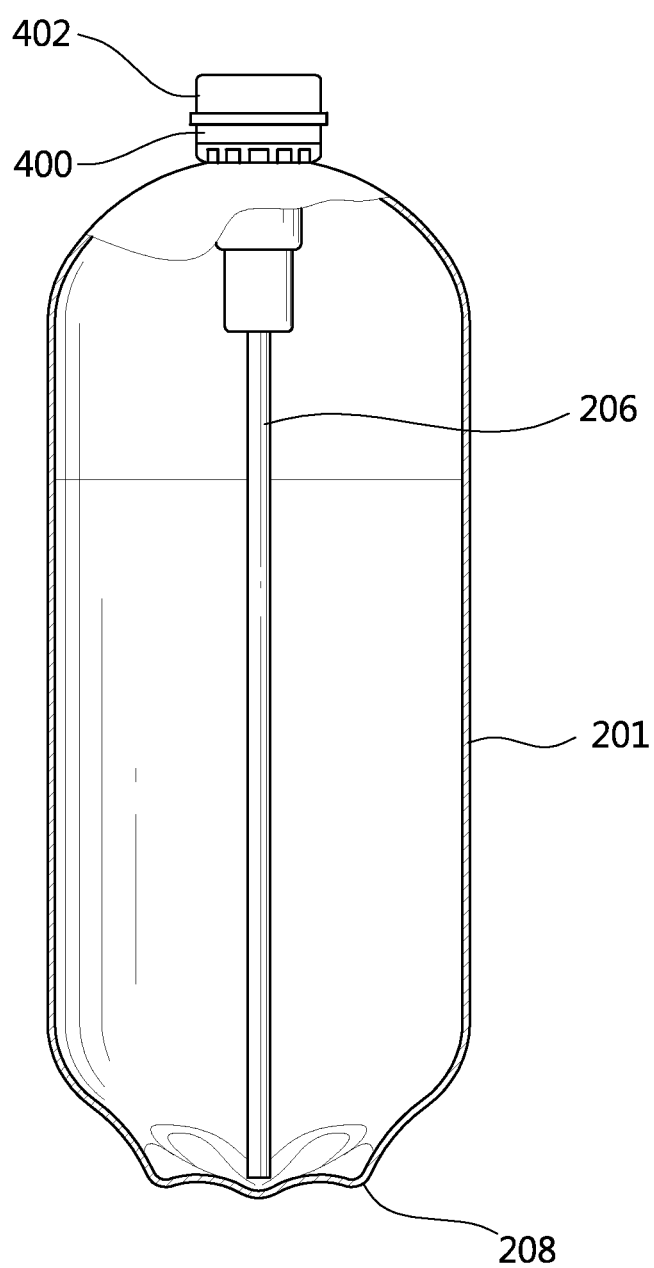
FIGS. 19 to 27 are diagrams for explaining a beer manufacturing apparatus according to an exemplary embodiment of the present disclosure.
Figure 20:
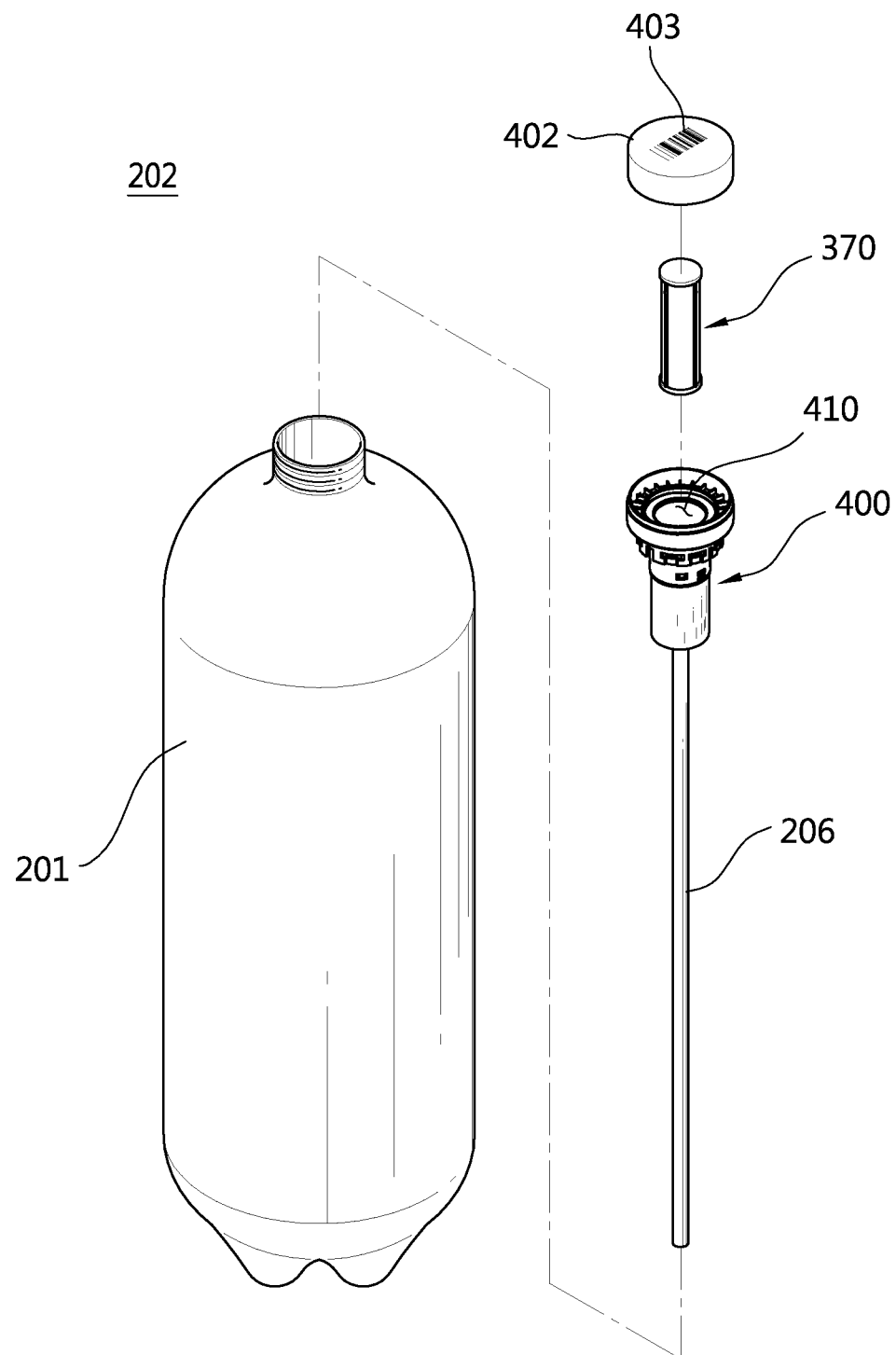
Figure 21:
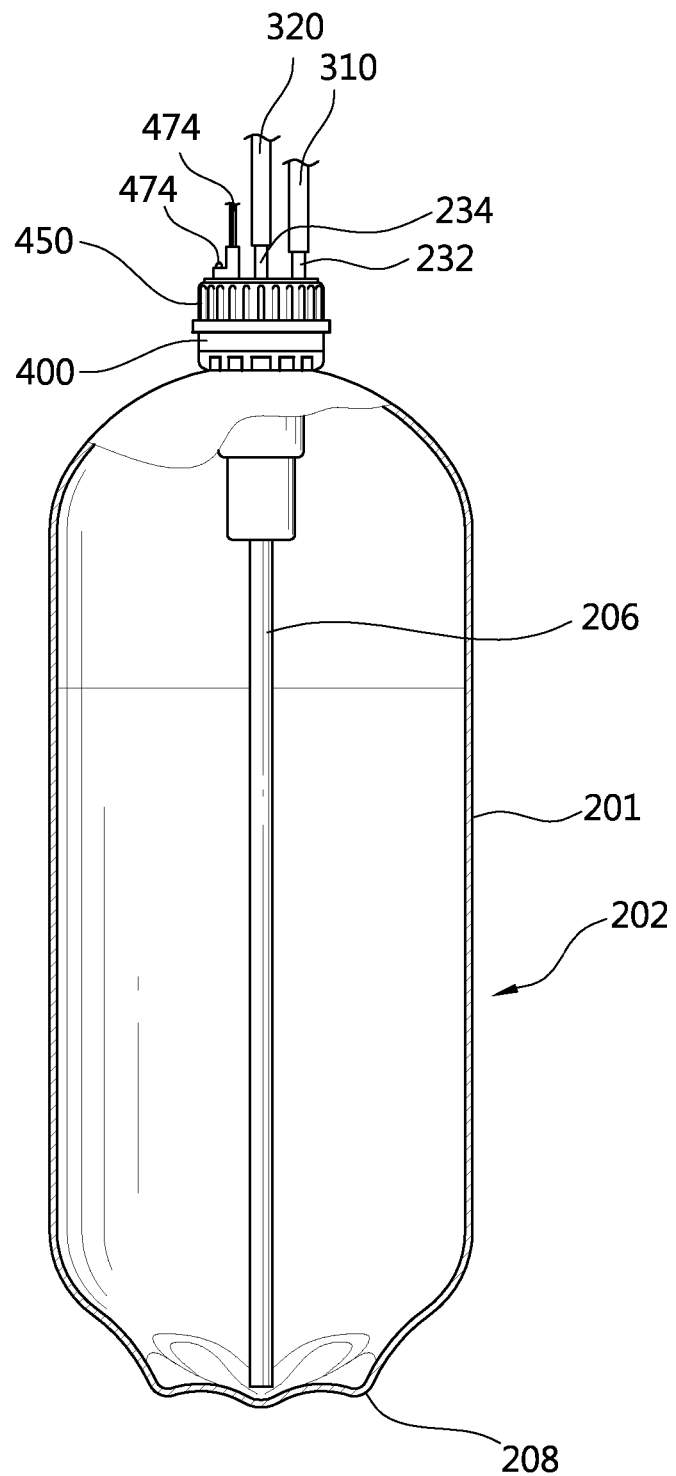
Figure 22:
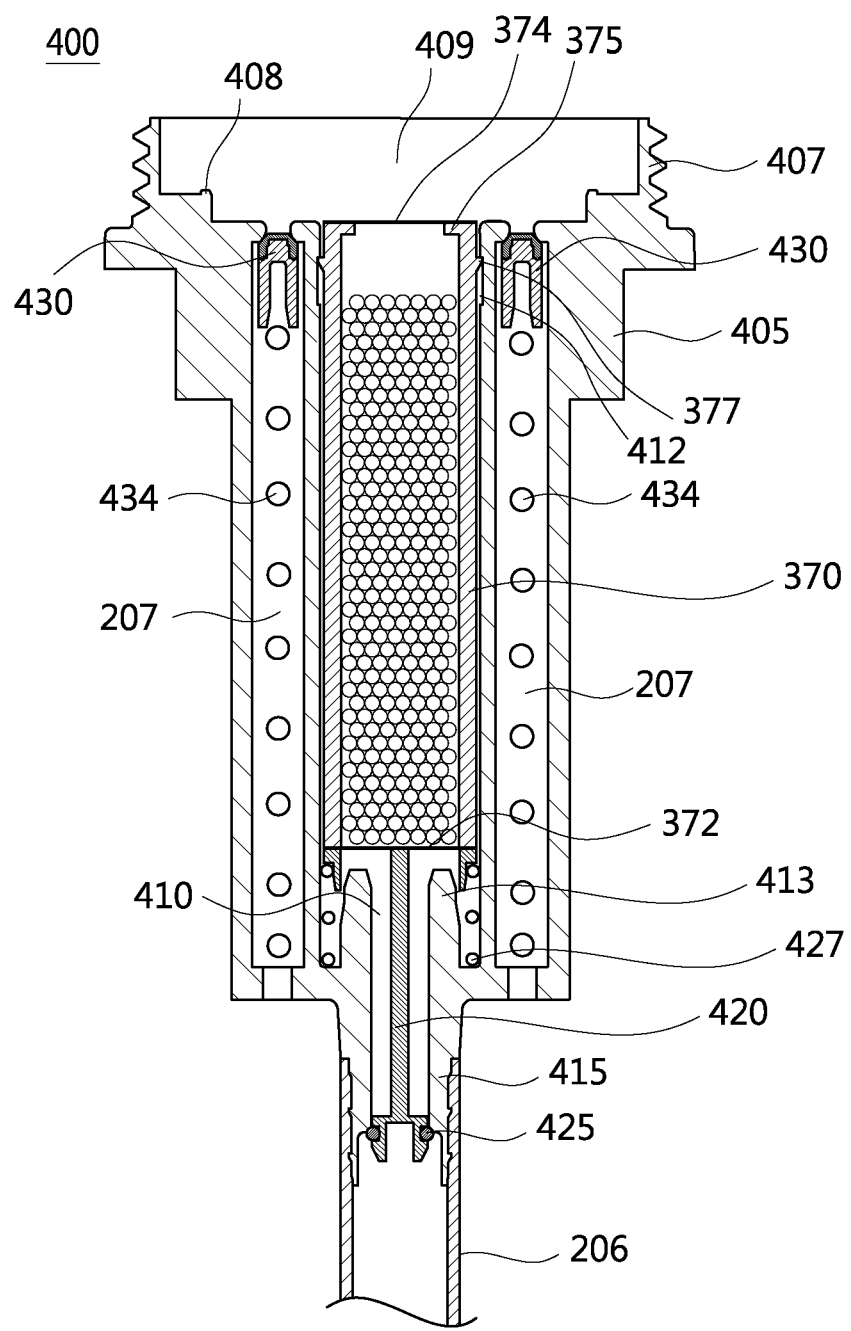
Figure 23:
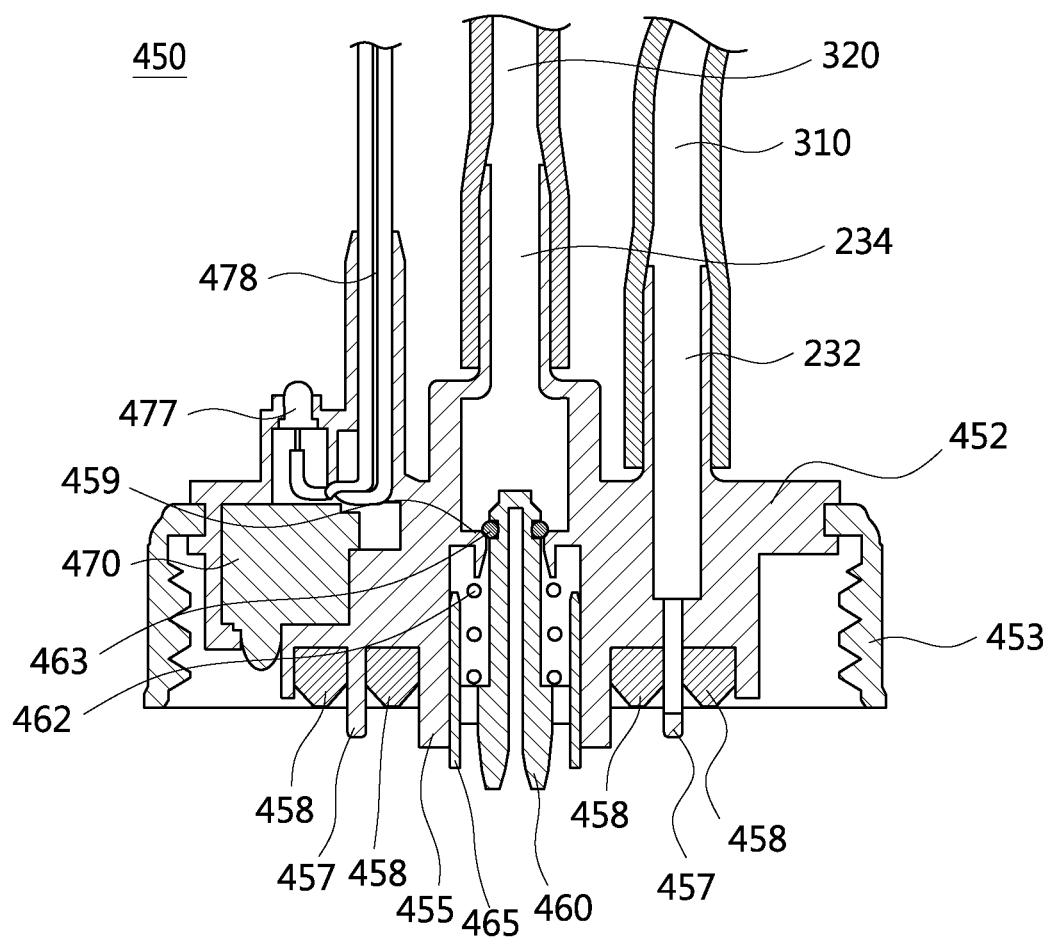
Figure 24:
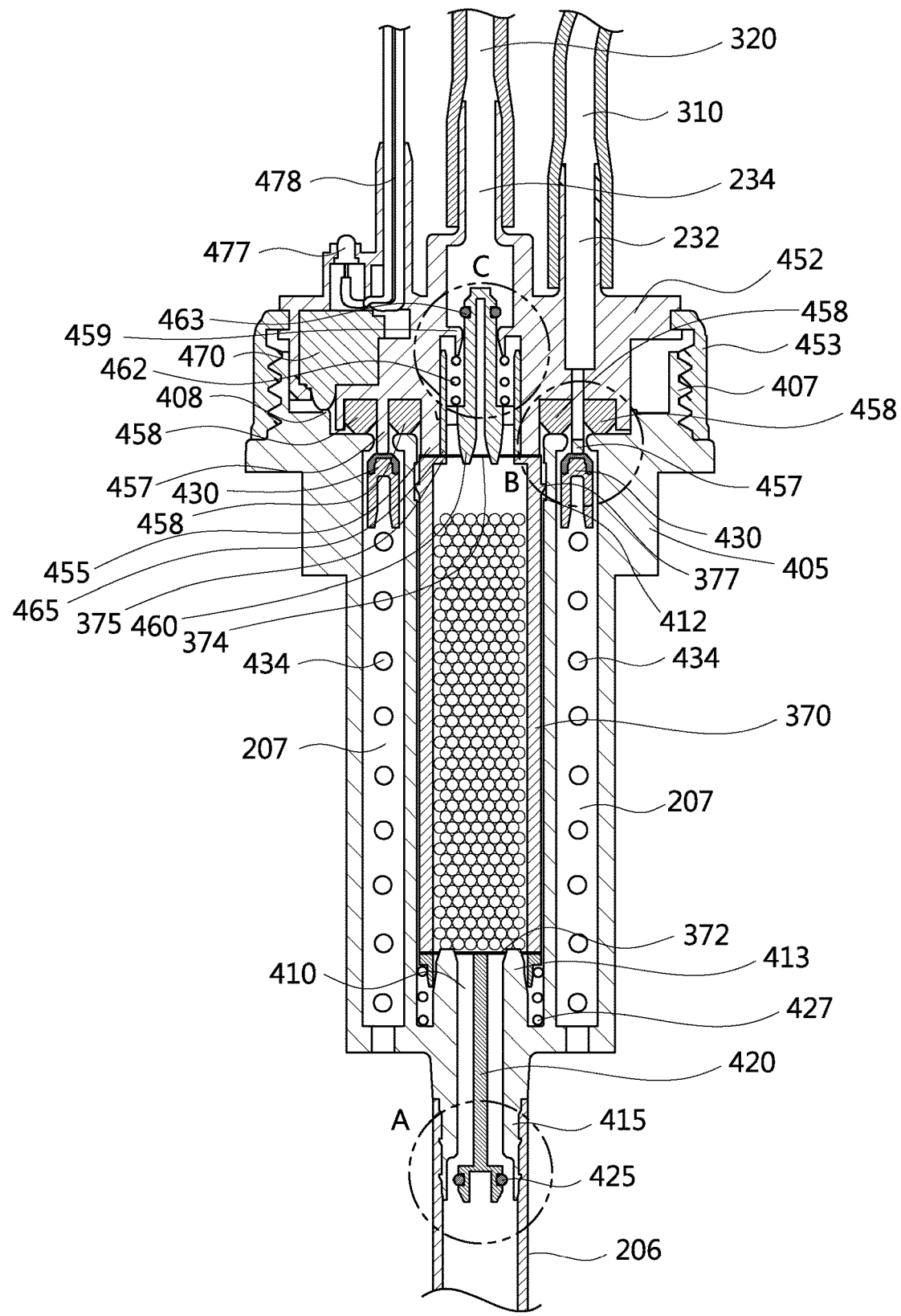
Figure 25:
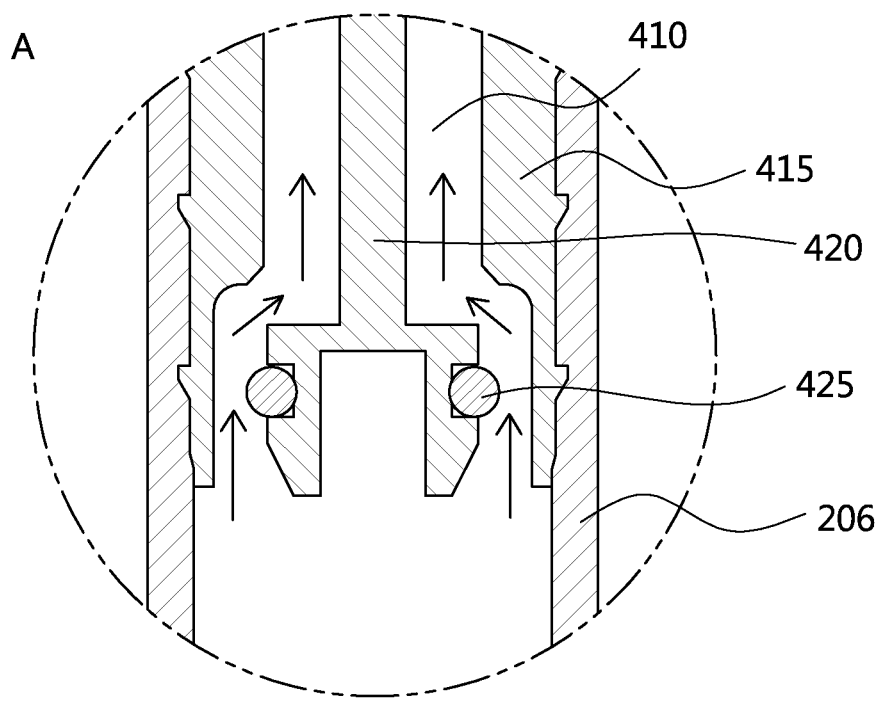
Figure 26:
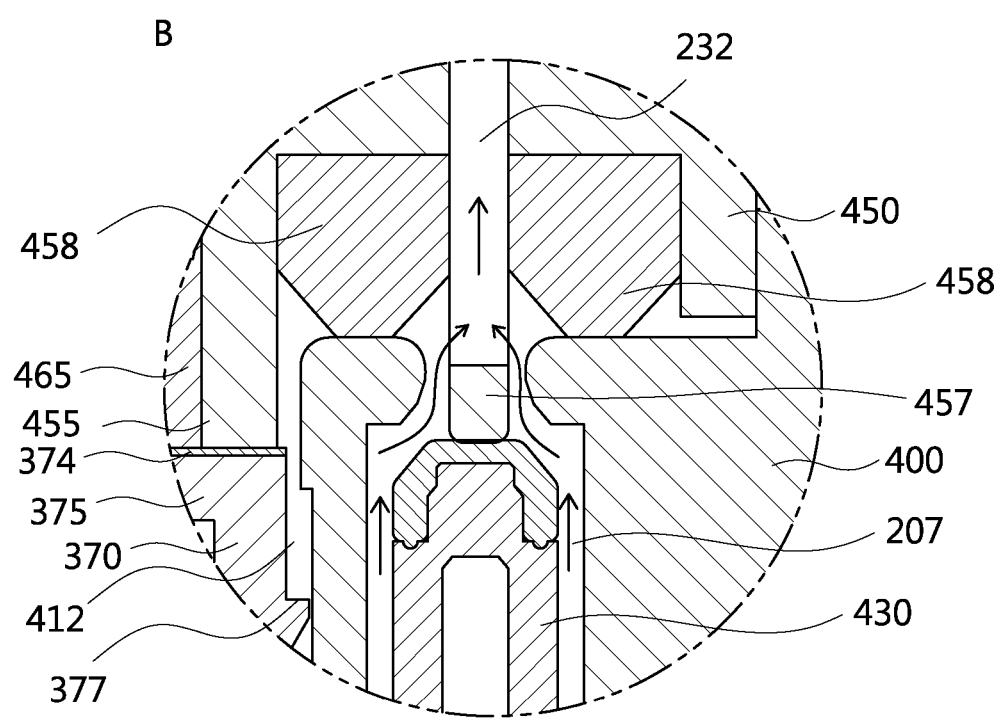
Figure 27:
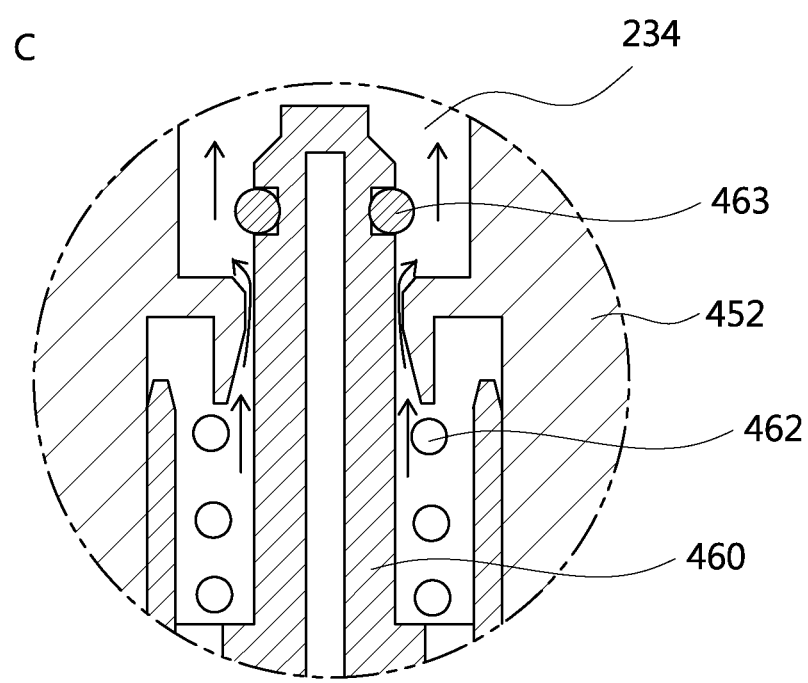

FIGS. 19 to 27 are diagrams for explaining a beer manufacturing apparatus according to an exemplary embodiment of the present disclosure, FIG. 19 is a diagram showing a keg containing wort therein provided in a beer manufacturing apparatus according to an exemplary embodiment of the present disclosure, FIG. 20 is an exploded diagram showing the keg containing the wort therein illustrated in FIG. 19, FIG. 21 is a diagram showing a state in which a coupler is coupled to a keg cap of the keg containing the wort therein illustrated in FIG. 19, FIG. 22 is a schematic cross-sectional view of a keg cap with an yeast capsule integrated therewith according to an exemplary embodiment of the present disclosure, FIG. 23 is a schematic cross-sectional view of a coupler coupled to the keg cap illustrated in FIG. 22, FIG. 24 is a schematic cross-sectional view of a state which the keg cap illustrated in FIG. 22 and the coupler illustrated in FIG. 23 are coupled to each other, FIG. 25 is an enlarged view of a portion 'A' of FIG. 24, FIG. 26 is an enlarged view of a portion 'B' of FIG. 24, and FIG. 27 is a an enlarged view of a portion 'C' of FIG. 24.

For overcoming the above problem, the beer manufacturing apparatus 10 according to the present embodiment may include an yeast capsule integration-type keg cap 400 and a coupler 450 coupled to the keg cap 400.

That is, in the beer manufacturing apparatus 10 according to the present embodiment, an yeast capsule 370 containing yeast to be supplied to the wort contained in the keg 202 may be integrated with the keg cap 400, and by simply coupling the keg cap 400 with the yeast capsule 370 integrated therewith to the coupler 450, the yeast contained in the yeast capsule 370 may be automatically and easily supplied to the wort contained in the keg 202.

The beer manufacturing apparatus 10 according to the present embodiment may include the chamber 210, the keg 202 containing wort therein and mounted in the chamber 210, the yeast capsule integration-type keg cap 400 that is coupled to the keg 202 to seal an internal part of the keg 202 and in which the yeast capsule 370 containing yeast to be supplied to the wort contained in the keg 202 is mounted, the coupler 450 that is fixedly installed in the chamber 210 and includes the wort line 234 and the air line 232, the flow path unit 304 for connecting the wort line 234 and the air line 232 of the coupler 450, the pump 260 connected to the flow path unit 304, and the controller 20 for controlling an operation of the pump 260 to supply the yeast contained in the yeast capsule 370 to the wort contained in the keg 202.

The yeast capsule integration-type keg cap 400 may include a wort discharge line 410 through which the wort contained in the keg 202 is discharged, a gas exhaust line 207 through which internal gas of the keg 202 is discharged, and the wort hose 206 coupled to a lower part of the wort discharge line 410 and is formed a long way to an internal bottom surface of the keg 202.

The yeast capsule 370 may be mounted in the wort discharge line 410.

When the keg cap 400 and the coupler 450 are coupled to each other, the wort line 234 of the coupler 450 may be connected to the wort discharge line 410 of the keg cap 400, and the air line 232 of the coupler 450 may be connected to the gas exhaust line 207 of the keg cap 400.

The flow path unit 304 may include a first flow path 310 for connecting the air line 232 of the coupler 450 to the pump 260, the second flow path 320 for connecting the wort line 234 of the coupler 450 to the pump 260, the gas exhaust 312 installed in the first flow path 310, the first valve 314 for opening and closing the gas exhaust 312, and the second valve 315 installed between the gas exhaust 312 and the pump 260 and configured to open and close the first flow path 310.

Then, the controller 20 may operate the pump 260 to pump the wort contained in the keg 202 to the second flow path 320 through the wort hose 206 and the wort discharge line 410 of the keg cap 400 and the wort line 234 of the coupler 450, and thus, the wort contained in the keg 202 may be moved through the yeast capsule 370 mounted in the wort discharge line 410 of the keg cap 400, thereby automatically supplying the yeast contained in the yeast capsule 370 to the wort contained in the keg 202.

The second flow path 320 may include a level sensor (not shown) for detecting wort.

Then, when the level sensor detects wort after the pump 260 is operated, the controller 20 may operate the pump 260 in an opposite direction to re-collect the wort to the keg 202, thereby preventing the wort to which the yeast is supplied from circulating in the entire flow path unit 304.

In addition, when the level sensor detects wort after the pump 260 is operated, the controller 20 may operate the pump 260 in an opposite direction to repeatedly collect the wort to the keg 202, thereby effectively supplying yeast to the wort contained in the keg 202.

The coupler 450 may include a contact switch 470 for generating a signal to the controller 20 when the coupler 450 is completely coupled to the keg cap 400, a wire unit 478 for connecting the contact switch 470 to the controller 20, and a light emitting unit 477 for emitting light when the contact switch 470 is connected to the wire unit 478 to generate a signal.

A flange groove 412 may be formed at an internal side of the wort discharge line 410, and a flange projection 377 caught by the flange groove 412 may be formed at an outer side of the yeast capsule 370.

Then, after the yeast capsule 370 is mounted in the wort discharge line 410, the flange projection 377 may be caught by the flange groove 412 to prevent the yeast capsule 370 from being separated from the wort discharge line 410.

Referring to FIGS. 21 and 22, the keg 202 containing wort therein provided by the beer manufacturing apparatus 10 according to an exemplary embodiment of the present disclosure may include a bottle 201 containing wort therein, the yeast capsule integration-type keg cap 400 that is coupled to the bottle 201 to seal an internal part of the bottle 201 and includes the wort discharge line 410 in which the yeast capsule 370 is mounted, and a keg cap lid 402 that is coupled to the keg cap 400 to protect the yeast capsule 370.

A barcode or QR code 403 including information on a type of the wort contained in the keg 202, a type of the yeast contained in the yeast capsule 370 mounted on the keg cap 400, a fermentation condition, or the like may be indicated at an upper end of the keg cap lid 402.

As shown in FIG. 23, at a place at which the beer manufacturing apparatus 10 according to an exemplary embodiment of the present disclosure is installed, the keg cap lid 402 may be decoupled from the provided keg 202, and then, the keg cap 400 may be coupled to the coupler 450, thereby easily mounting the keg 202 in the chamber 210.

Hereinafter, a yeast capsule integration-type keg cap and a coupler coupled to the keg cap will be described in detail with reference to FIGS. 20 to 27.

The yeast capsule integration-type keg cap 400 according to an exemplary embodiment of the present disclosure may include a keg coupling unit 405, the wort discharge line 410, the gas exhaust line 207, the yeast capsule 370, a keg cap blade 413, a yeast capsule support 420, a first spring 427, a second sealing member 430, and a second spring 434.

The keg coupling unit 405 may be a component that is coupled to the keg 202 containing the wort therein to seal an internal part of the keg 202 and may protrude at opposite sides of an approximately upper part of the keg cap 400.

A coupler coupling unit 407 to which the coupler 450 is coupled may be installed at an upper part of the keg cap 400, and an accommodation groove 409 on which the coupler 450 coupled to the coupler coupling unit 407 is accommodated may be installed between two parts of the coupler coupling unit 407.

The wort discharge line 410 may be a channel through which the wort contained in the keg 202 is discharged and may be formed through an approximately central portion of the keg cap 400.

The gas exhaust line 207 may be a channel through which internal gas of the keg 202 is discharged and may be formed through an approximate edge of the keg cap 400.

The yeast capsule 370 may be a component containing yeast therein, to be supplied to the wort contained in the keg 202, and may be mounted in the wort discharge line 410.

In order to prevent the yeast capsule 370 mounted in the wort discharge line 410 from being separated therefrom, the flange groove 412 may be formed at an internal side of the wort discharge line 410, and the flange projection 377 caught by the flange groove 412 may be formed at an outer side of the yeast capsule 370.

The yeast capsule 370 may be compressed by the coupler 450 accommodated on the accommodation groove 409 when the keg cap 400 is coupled to the coupler 450.

The keg cap blade 413 may be installed at a lower part of the wort discharge line 410.

The yeast capsule support 420 may be installed between the yeast capsule 370 and the keg cap blade 413 and may support the yeast capsule 370.

The first spring 427 may support the yeast capsule support 420.

Then, as shown in FIG. 22, a lower end sealing unit 372 for sealing an internal part of the yeast capsule 370 may maintain a state in which the lower end sealing unit 372 does not contact the keg cap blade 413 due to the first spring 427 and the yeast capsule support 420 until the keg cap 400 is coupled to the coupler 450 and is compressed by the yeast capsule 370, and thus, the lower end sealing unit 372 may be prevented from being worn by the keg cap blade 413 to prevent sealing of the internal part of the yeast capsule 370 from being released.

In contrast, as show in FIG. 24, when the keg cap 400 is coupled to the coupler 450 and the yeast capsule 370 is compressed, the yeast capsule support 420 may be lowered as the first spring 427 is compressed, and when the yeast capsule support 420 is lowered, the lower end sealing unit 372 of the yeast capsule 370 may be worn and open by the keg cap blade 413.

A first sealing member 425 for sealing the wort discharge line 410 may be installed at a lower part of the yeast capsule support 420.

Then, as shown in FIG. 25, the yeast capsule support 420 may be supported upward by the first spring 427 until the keg cap 400 is coupled to the coupler 450, and thus, the wort discharge line 410 may be maintained to be sealed by the first sealing member 425 installed at the lower part of the yeast capsule support 420.

In contrast, as shown in FIG. 25, when the keg cap 400 is coupled to the coupler 450 and the yeast capsule 370 is compressed, the yeast capsule support 420 may be lowered as the first spring 427 is compressed, sealing of the wort discharge line 410 by the first sealing member 425 may be released.

Thus, the lower end sealing unit 372 of the yeast capsule 370 and the first sealing member 425 may be maintained to seal the internal part of the yeast capsule 370 and the wort discharge line 410, respectively, until the keg cap 400 is coupled to the coupler 450, and then, when the keg cap 400 is coupled to the coupler 450, the internal part of the yeast capsule 370 and the wort discharge line 410 may be simultaneously connected to each other.

The second sealing member 430 may be a component for sealing the gas exhaust line 207, and the second spring 434 may be a component for supporting the second sealing member 430.

As shown in FIG. 22, the second sealing member 430 may be supported upward by elastic force of the second spring 434 until the keg cap 400 is coupled to the coupler 450, and thus, a state in which the gas exhaust line 207 is sealed may be maintained.

In contrast, as shown in FIG. 26, when the keg cap 400 is coupled to the coupler 450, sealing of the gas exhaust line 207 may be sealed as the second sealing member 430 is compressed.

A wort hose coupling unit 415 to which the wort hose 206 formed a long way to an internal bottom surface of the keg 202 is coupled may be installed at a lower part of the wort discharge line 410.

Referring to FIGS. 23 and 24, according to an exemplary embodiment of the present disclosure, the coupler 450 coupled to the keg cap 400 may include a body 452 including the wort line 234 and the air line 232, a coupler guide 453 for compressing the body 452 when the coupler 450 is coupled to the keg cap 400, an yeast capsule compressor 455 that protrudes at a lower part of the body 452 and compresses the yeast capsule 370 when the coupler guide 453 is coupled to the keg cap 400, a second sealing member compressor 457 that protrudes at a lower part of the body 452 and compresses the second sealing member 430 to connect the gas exhaust line 207 of the keg cap 400 to the air line 232 of the coupler 450 when the coupler guide 453 is coupled to the keg cap 400, and a coupler blade 460 installed in the wort line 234 and configured to wear and open an upper end sealing unit 374 of the yeast capsule 370 when the coupler guide 453 is coupled to the keg cap 400.

The coupler 450 may further include a third spring 462 that is installed between a wort line flange projection 459 and the coupler blade 460 that are formed at an internal part of the wort line 234 and compress the coupler blade 460 downward, a third sealing member 463 that is caught by the wort line flange projection 459 to prevent the coupler blade 460 from being separated downward and to, simultaneously, seal the wort line 234 when the third spring 462 compresses the coupler blade 460 downward may be installed at an upper part of the coupler blade 460, and an edge portion 465 of the coupler blade 460 may contact an edge of an upper end of the yeast capsule 370 to compress the third spring 462 upward in order to release sealing of the wort line 234 by the third sealing member 463 when the coupler guide 453 is coupled to the keg cap 400.

In this case, a central portion of the coupler blade 460 may protrude downward compared with the edge portion 465. Then, before the edge portion 465 contacts the edge of the upper end of the yeast capsule 370, the coupler blade 460 may wear and open an upper end sealing unit 374 of the yeast capsule 370.

An internal flange projection 375 that protrudes inward may be formed at the edge of the upper end of the yeast capsule 370. Then, when the coupler guide 453 is coupled to the keg cap 400, the edge portion 465 of the coupler blade 460 may easily contact the edge of the upper end of the yeast capsule 370.

Thus, as shown in FIG. 23, before the coupler guide 453 is coupled to the keg cap 400, the third sealing member 463 may not be separated from the body 452 while the third sealing member 463 is caught by the wort line flange projection 459 in a state in which the coupler blade 460 protrudes downward by compressing the third spring 462 downward, and the wort line 234 of the coupler 450 may be maintained to be sealed by the third sealing member 463.

In contrast, as shown in FIGS. 24 and 27, when the coupler guide 453 is coupled to the keg cap 400, the upper end sealing unit 374 of the yeast capsule 370 may be worn and open by the coupler blade 460 as the body 452 may be moved downward by compressing the coupler guide 453 downward, and after the upper end sealing unit 374 is worn and open, sealing of the wort line 234 by the third sealing member 463 may be released as the third spring 462 is compressed upward while the edge portion 465 of the coupler blade 460 contacts an edge of an upper end of the yeast capsule 370.

Then, the wort discharge line 410 of the keg cap 400 and the wort line 234 of the coupler 450 may be connected to each other across the yeast capsule 370 in which the upper end sealing unit 374 and the lower end sealing unit 372 are worn and open.

The coupler 450 may further include a fourth sealing member 458 that is installed at opposite sides of the second sealing member compressor 457 and seals a connection portion of the gas exhaust line 207 and the air line 232, which is formed when the keg cap 400 and the coupler 450 are coupled to each other.

The coupler 450 may further include the contact switch 470 that is installed in the body 452 and contacts a protrusion 408 installed at an upper end of the keg cap 400 to generate a signal when the coupler guide 453 is completely coupled to the coupler coupling unit 407 of the keg cap 400, and the light emitting unit 477 for emitting light when the contact switch 470 generates a signal.

As described above, the present disclosure relates to a beer manufacturing apparatus for directly producing and selling beer with living yeast on location without professional knowledge and automatically and easily manufacturing various types of beer at low cost at one time without being contaminated by contact with the outside, and embodiments of the present disclosure may be changed in various forms. Accordingly, the embodiments are not limited by the disclosure in the specification, and any changeable form by one of ordinary skill in the art to which the embodiments pertain may also belong to the scope of the embodiments of the present disclosure.

The invention claimed is:

1. A yeast capsule integration-type keg cap comprising:
   a keg coupling unit coupled to a keg containing wort therein;
   a wort discharge line through which the wort contained in the keg is discharged;
   a yeast capsule installed in the wort discharge line and configured to contain yeast therein, to be supplied to the wort contained in the keg;
   a keg cap blade installed at a lower part of the wort discharge line;
   a yeast capsule support installed between the yeast capsule and the keg cap blade and configured to support the yeast capsule; and
   a first spring configured to support the yeast capsule support,
   wherein the yeast capsule support is lowered as the first spring is compressed when the yeast capsule is compressed; and
   wherein a lower end sealing unit of the yeast capsule is worn and open by the keg cap blade.

2. The yeast capsule integration-type keg cap of claim 1, further comprising:
   a first sealing member installed at a lower part of the yeast capsule support and configured to seal the wort discharge line,
   wherein sealing of the wort discharge line of the first sealing member is released when the yeast capsule support is lowered.

3. The yeast capsule integration-type keg cap of claim 1, further comprising:
   a gas exhaust line through which internal gas of the keg is discharged;
   a second sealing member configured to seal the gas exhaust line; and
   a second spring configured to support the second sealing member.

4. The yeast capsule integration-type keg cap of claim 3, wherein sealing of the gas exhaust line is released as the second spring is compressed when the second sealing member is compressed.

5. The yeast capsule integration-type keg cap of claim 1, wherein a flange groove is formed at an internal side of the wort discharge line, and an outer flange projection caught by the flange groove is formed at an outer side of the yeast capsule.

6. The yeast capsule integration-type keg cap of claim 1, wherein a wort hose coupling unit, to which a wort hose formed a long way to an internal bottom surface of the keg is coupled, is installed at a lower part of the wort discharge line.

* * * * *